(12) United States Patent
Sasaki et al.

(10) Patent No.: US 9,620,153 B1
(45) Date of Patent: Apr. 11, 2017

(54) MAGNETIC HEAD FOR PERPENDICULAR MAGNETIC RECORDING INCLUDING A COIL FOR INDIVIDUALLY DRIVING A MAIN POLE AND A YOKE

(71) Applicants: Yoshitaka Sasaki, Los Gatos, CA (US); Kazuki Sato, Milpitas, CA (US); Hiroyuki Ito, Milpitas, CA (US); Shigeki Tanemura, Milpitas, CA (US); Masakazu Okada, Milpitas, CA (US)

(72) Inventors: Yoshitaka Sasaki, Los Gatos, CA (US); Kazuki Sato, Milpitas, CA (US); Hiroyuki Ito, Milpitas, CA (US); Shigeki Tanemura, Milpitas, CA (US); Masakazu Okada, Milpitas, CA (US)

(73) Assignee: HEADWAY TECHNOLOGIES, INC., Milpitas ( * ) Notice: Subject to any disclaimer, the term of this patent is extended or adjusted under 35 U.S.C. 154(b) by 0 days.

(21) Appl. No.: 15/095,750

(22) Filed: Apr. 11, 2016

(51) Int. Cl.
*G11B 5/127* (2006.01)
*G11B 5/39* (2006.01)
*G11B 5/17* (2006.01)

(52) U.S. Cl.
CPC .......... *G11B 5/3912* (2013.01); *G11B 5/1278* (2013.01); *G11B 5/17* (2013.01)

(58) Field of Classification Search
None
See application file for complete search history.

(56) References Cited

U.S. PATENT DOCUMENTS

| | | | |
|---|---|---|---|
| 8,373,945 B1* | 2/2013 | Luo | G11B 5/1278 360/123.11 |
| 8,817,418 B1* | 8/2014 | Matsuo | G11B 5/315 360/125.02 |
| 8,867,168 B2 | 10/2014 | Ota et al. | |
| 8,873,199 B2* | 10/2014 | Meolche | G11B 5/17 360/123.04 |
| 8,995,085 B2* | 3/2015 | Yamada | G11B 5/1278 360/119.03 |
| 2008/0112080 A1* | 5/2008 | Lengsfield | G11B 5/1278 360/125.04 |
| 2008/0180838 A1* | 7/2008 | Im | G11B 5/1278 360/125.03 |
| 2010/0118439 A1* | 5/2010 | Aoki | G11B 5/1278 360/125.01 |
| 2010/0157462 A1* | 6/2010 | Koizumi | G11B 5/3123 360/71 |
| 2011/0127234 A1* | 6/2011 | Watanabe | G11B 5/115 216/22 |
| 2013/0321955 A1* | 12/2013 | Benakli | G11B 5/11 360/235.4 |
| 2013/0329319 A1* | 12/2013 | Sasaki | G11B 5/17 360/123.12 |

(Continued)

*Primary Examiner* — Jefferson Evans
(74) *Attorney, Agent, or Firm* — Oliff PLC

(57) ABSTRACT

A magnetic head includes a coil, a main pole, a write shield and first and second yokes. The first and second yokes are connected to the write shield. The coil includes a main coil portion for driving the main pole, a first sub-coil portion for driving the first yoke, and a second sub-coil portion for driving the second yoke. A magnetic field produced in the main pole by the main coil portion and a magnetic field produced in each of the first and second yokes by the first and second sub-coil portions are in directions opposite to each other.

5 Claims, 13 Drawing Sheets

(56) References Cited

U.S. PATENT DOCUMENTS

2014/0160597 A1\* 6/2014 Ota .................. G11B 5/1278
                                                    360/234.3
2014/0177099 A1\* 6/2014 Sasaki ............... G11B 5/1278
                                                    360/123.12

\* cited by examiner

MAGNETIC HEAD FOR PERPENDICULAR MAGNETIC RECORDING INCLUDING A COIL FOR INDIVIDUALLY DRIVING A MAIN POLE AND A YOKE

BACKGROUND OF THE INVENTION

1. Field of the Invention

The present invention relates to a magnetic head for perpendicular magnetic recording for use to write data on a recording medium by means of a perpendicular magnetic recording system.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole passes a magnetic flux corresponding to the magnetic field produced by the coil, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium. The recording medium includes a magnetic recording layer. Tracks are concentrically formed in the magnetic recording layer. The tracks are the area of the magnetic recording layer on which data is to be written.

Here, the side of positions closer to a leading end relative to a reference position will be defined as the leading side, and the side of positions closer to a trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording density, it is necessary to prevent unwanted erasure.

In order to prevent unwanted erasure induced by the skew and achieve higher recording density, it is effective to provide a write shield in the vicinity of the main pole. U.S. Pat. No. 8,867,168 B2 discloses a magnetic head with a write shield having an end face that is located in the medium facing surface and surrounds the end face of the main pole.

In a magnetic head including the write shield, there is typically provided a return path section for connecting the write shield to a part of the main pole located away from the medium facing surface. By providing such a return path section, a space is defined between the main pole, the return path section and the write shield, and a magnetic path is formed through the main pole, the return path section and the write shield. The coil passes through the aforementioned space, and produces a magnetic flux to pass through the aforementioned magnetic path. The main pole produces a write magnetic field in response to the magnetic flux.

Examples of coils for use in magnetic heads for perpendicular magnetic recording include a helical coil wound around a main pole, such as one disclosed in U.S. Pat. No. 8,867,168 B2.

Magnetic heads for perpendicular magnetic recording are increasing in frequency of write signals to achieve higher recording densities. Accordingly, it is demanded of magnetic heads for perpendicular magnetic recording that the rate of magnetization reversal of the main pole be increased.

In a conventional magnetic heads for perpendicular magnetic recording including the helical coil, the entire magnetic path passing through the main pole, the return path section and the write shield is driven by the helical coil. The magnetic path is relatively long. Further, the total volume of the main pole, the return path section and the write shield is relatively large. Accordingly, for the conventional magnetic heads for perpendicular magnetic recording, increasing the rate of magnetization reversal of the main pole is difficult with a helical coil that is small in the number of turns and magnetomotive force. Even if the number of turns of the helical coil is increased to produce a greater magnetomotive force, increasing the rate of magnetization reversal of the main pole is still difficult because the increase in the number of turns makes the aforementioned magnetic path longer and increases the total volume of the main pole, the return path section and the write shield.

OBJECT AND SUMMARY OF THE INVENTION

It is an object of the present invention to provide a magnetic head for perpendicular magnetic recording that achieves a faster magnetization reversal of the main pole.

A magnetic head for perpendicular magnetic recording of the present invention includes: a medium facing surface that faces a recording medium; a coil that produces a magnetic field corresponding to data to be written on the recording medium; a main pole; a write shield formed of a magnetic material; and at least one yoke formed of a magnetic material. The main pole has an end face located in the medium facing surface. The main pole allows a magnetic flux corresponding to the magnetic field produced by the coil to pass, and produces a write magnetic field for writing the data on the recording medium by means of a perpendicular magnetic recording system. The write shield has an end face located in the medium facing surface. The at least one yoke is connected to the write shield.

The coil includes a main coil portion for driving the main pole, and at least one sub-coil portion for driving the at least one yoke. The main coil portion surrounds at least part of the entire perimeter of the main pole as viewed from the medium facing surface. The at least one sub-coil portion surrounds at least part of the entire perimeter of the at least one yoke as viewed from the medium facing surface. The main coil portion and the at least one sub-coil portion are configured so that a magnetic field produced in the main pole by the main coil portion and a magnetic field produced in the at least one yoke by the at least one sub-coil portion are in directions opposite to each other.

In the magnetic head of the present invention, the at least one yoke may be at least a first yoke and a second yoke located on opposite sides of the main pole in a track width direction. The at least one sub-coil portion may be at least a first sub-coil portion and a second sub-coil portion. The first sub-coil portion surrounds at least part of the entire perimeter of the first yoke as viewed from the medium facing surface. The second sub-coil portion surrounds at least part of the entire perimeter of the second yoke as viewed from the medium facing surface.

The write shield may include a first side shield and a second side shield located on opposite sides of the main pole in the track width direction. In this case, the first yoke is connected to the first side shield, and the second yoke is connected to the second side shield.

The coil may include a winding constituting the main coil portion and the first and second sub-coil portions. The winding may extend to pass around the first yoke, around the main pole, and around the second yoke in alternating directions.

The winding may include a first dedicated portion, a first common portion, a second dedicated portion, a second common portion and a third dedicated portion connected in series in this order. The first dedicated portion is located around the first yoke. The first common portion extends to pass through between the main pole and the first yoke. The second dedicated portion is located around the main pole. The second common portion extends to pass through between the main pole and the second yoke. The third dedicated portion is located around the second yoke. In this case, the first sub-coil portion includes the first dedicated portion and the first common portion. The main coil portion includes the first common portion, the second dedicated portion and the second common portion. The second sub-coil portion includes the second common portion and the third dedicated portion.

The winding may further include a third common portion, a fourth dedicated portion, a fourth common portion and a fifth dedicated portion. In this case, the first dedicated portion, the first common portion, the second dedicated portion, the second common portion, the third dedicated portion, the third common portion, the fourth dedicated portion, the fourth common portion and the fifth dedicated portion are connected in series in this order. The third common portion extends to pass through between the main pole and the second yoke. The fourth dedicated portion is located around the main pole. The fourth common portion extends to pass through between the main pole and the first yoke. The fifth dedicated portion is located around the first yoke. In this case, the first sub-coil portion includes the first dedicated portion, the first common portion, the fourth common portion and the fifth dedicated portion. The main coil portion includes the first common portion, the second dedicated portion, the second common portion, the third common portion, the fourth dedicated portion and the fourth common portion. The second sub-coil portion includes the second common portion, the third dedicated portion and the third common portion.

The magnetic head of the present invention may further include a coupling section for coupling a portion of the main pole apart from the medium facing surface to a portion of the at least one yoke apart from the medium facing surface. Alternatively, the main pole and the at least one yoke may be separate from each other.

According to the present invention, the coil includes the main coil portion for driving the main pole, and the at least one sub-coil portion for driving the at least one yoke. The present invention thus allows an increase in the rate of magnetization reversal of the main pole.

Other objects, features and advantages of the present invention will become fully apparent from the following description.

DETAILED DESCRIPTION OF THE PREFERRED EMBODIMENTS

First Embodiment

Figure 1:
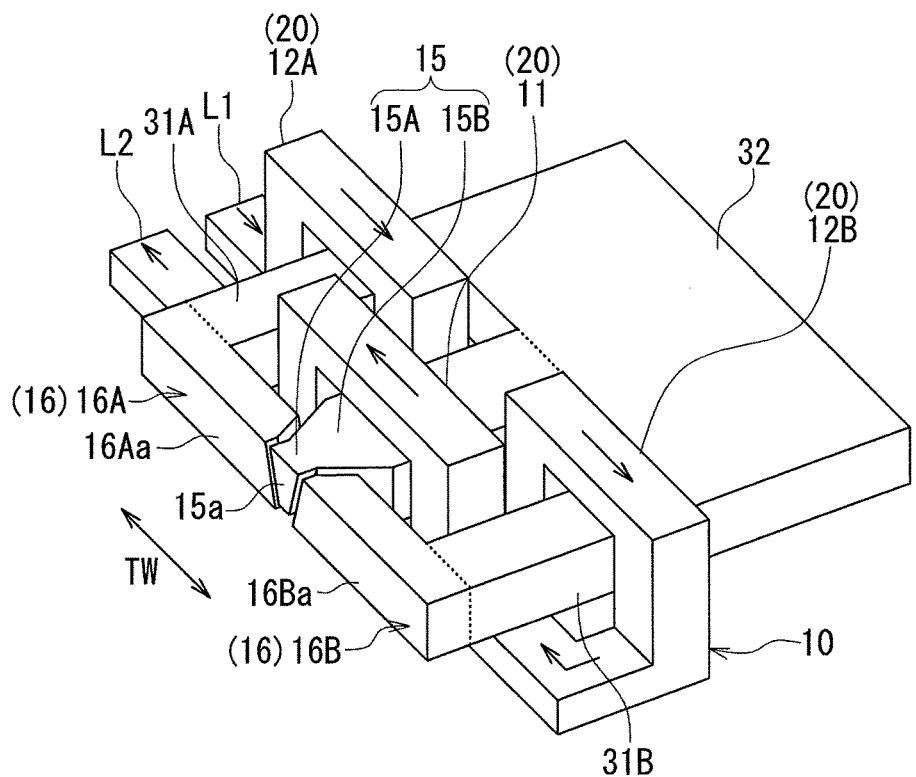
FIG. 1 is a perspective view showing the main part of a magnetic head according to a first embodiment of the invention.
Figure 2:
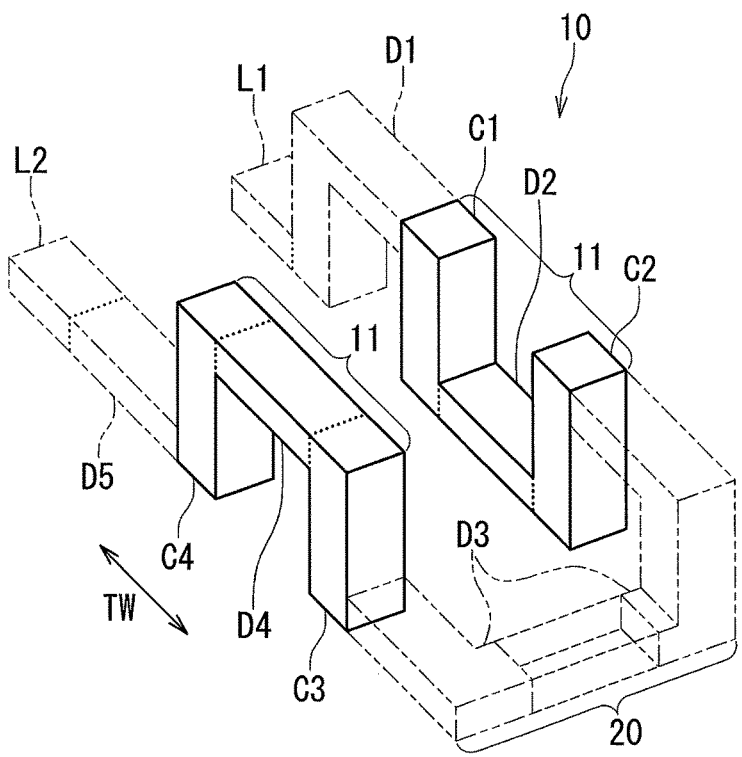
FIG. 2 is a perspective view showing a main coil portion of a coil of the magnetic head according to the first embodiment of the invention.
Figure 3:
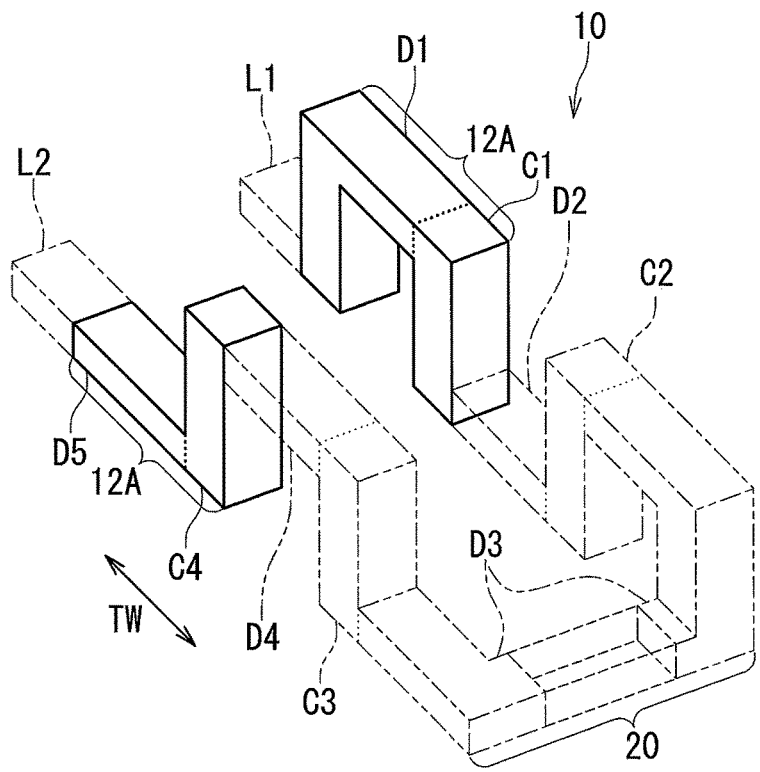
FIG. 3 is a perspective view showing a first sub-coil portion of the coil of the magnetic head according to the first embodiment of the invention.
Figure 4:
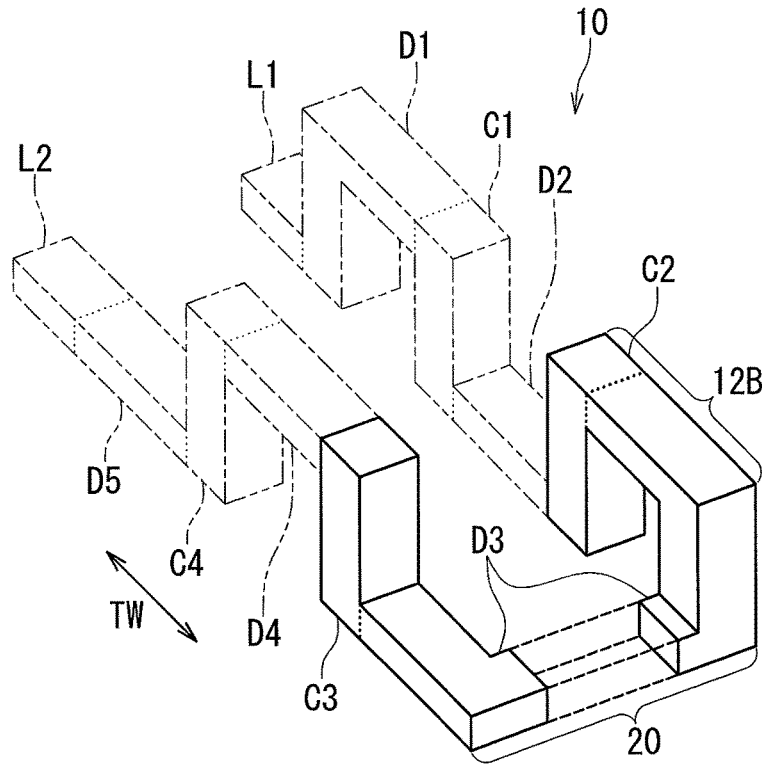
FIG. 4 is a perspective view showing a second sub-coil portion of the coil of the magnetic head according to the first embodiment of the invention.
Figure 5:
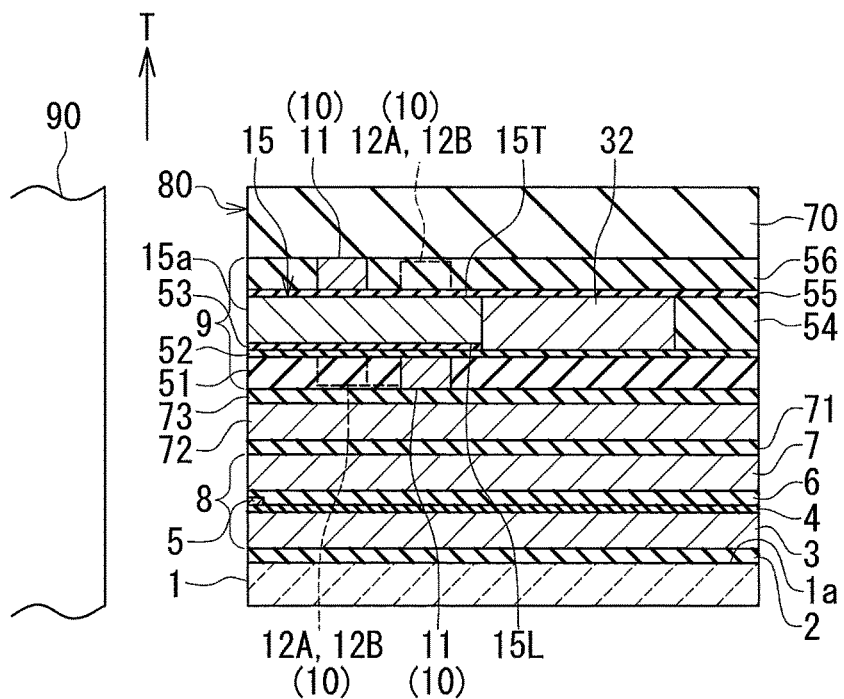
FIG. 5 is a cross-sectional view of the magnetic head according to the first embodiment of the invention.
Figure 6:
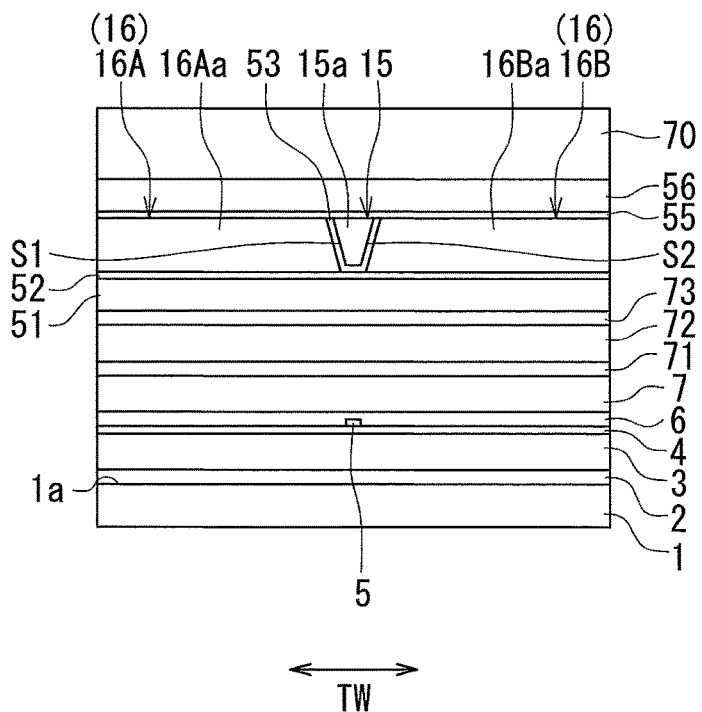
FIG. 6 is a front view showing the medium facing surface of the magnetic head according to the first embodiment of the invention.

Preferred embodiments of the present invention will now be described in detail with reference to the drawings. First, reference is made to FIG. 1 to FIG. 6 to describe the configuration of a magnetic head for perpendicular magnetic recording (hereinafter simply referred to as magnetic head) according to a first embodiment of the invention. FIG. 1 is a perspective view showing the main part of the magnetic head according to the present embodiment. FIG. 2 is a perspective view showing a main coil portion of a coil of the magnetic head according to the present embodiment. FIG. 3 is a perspective view showing a first sub-coil portion of the coil of the magnetic head according to the present embodiment. FIG. 4 is a perspective view showing a second sub-coil portion of the coil of the magnetic head according to the present embodiment. FIG. 5 is a cross-sectional view of the magnetic head according to the present embodiment. The arrow labeled T in FIG. 5 indicates the direction of travel of a recording medium. FIG. 6 is a front view showing the medium facing surface of the magnetic head according to the present embodiment. In FIG. 1 to FIG. 4, and FIG. 6 the arrow labeled TW indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Here, the side of the positions closer to the leading end relative to a reference position will be referred to as the leading side, and the side of the positions closer to the trailing end relative to the reference position will be referred to as the trailing side. The leading side is the rear side in the direction T of travel of the recording medium 90 relative to the slider. The trailing side is the front side in the direction T of travel of the recording medium 90 relative to the slider.

As shown in FIG. 5, the magnetic head has the medium facing surface 80 mentioned above. As shown in FIG. 5 and FIG. 6, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes a coil 10, and a main pole 15. The coil 10 produces a magnetic field corresponding to data to be written on the recording medium 90. The main pole 15 has an end face 15a located in the medium facing surface 80. The main pole 15 passes a magnetic flux corresponding to the magnetic field produced by the coil 10, and produces a write magnetic field for use to write data on the recording medium 90 by means of a perpendicular magnetic recording system. FIG. 5 shows a cross section that intersects the end face 15a of the main pole 15 and that is perpendicular to the medium facing surface 80 and to the top surface 1a of the substrate 1. The coil 10 is formed of a conductive material such as copper.

The write head unit 9 further includes a write shield 16 formed of a magnetic material. For example, one of CoFeN, CoNiFe, FeNi, and CoFe can be used as the material of the write shield 16. The write shield 16 has an end face located in the medium facing surface 80. The end face of the write shield 16 includes a first end face portion 16Aa and a second end face portion 16Ba. The first and second end face portions 16Aa and 16Ba are located on opposite sides of the end face 15a of the main pole 15 in the track width direction TW.

The write shield 16 includes a first side shield 16A and a second side shield 16B located on opposite sides of the main pole 15 in the track width direction TW. The first side shield 16A has the first end face portion 16Aa. The second side shield 16B has the second end face portion 16Ba.

The write head unit 9 further includes at least one yoke formed of a magnetic material. The at least one yoke is connected to the write shield 16. In the present embodiment, in particular, the at least one yoke is a first yoke 31A and a second yoke 31B located on opposite sides of the main pole 15 in the track width direction TW. The first yoke 31A is connected to the first side shield 16A. The second yoke 31B is connected to the second side shield 16B. In FIG. 1 the boundary between the first side shield 16A and the first yoke 31A and the boundary between the second side shield 16B and the second yoke 31B are shown by dotted lines. For example, one of CoFeN, CoNiFe, FeNi, and CoFe can be used as the material of the first and second yokes 31A and 31B.

The coil 10 includes a main coil portion 11 for driving the main pole 15, and at least one sub-coil portion for driving the at least one yoke. The main coil portion 11 surrounds at least part of the entire perimeter of the main pole 15 as viewed from the medium facing surface 80. The at least one sub-coil portion surrounds at least part of the entire perimeter of the at least one yoke as viewed from the medium facing surface 80. The main coil portion 11 and the at least one sub-coil portion are configured so that a magnetic field produced in the main pole 15 by the main coil portion 11 and a magnetic field produced in the at least one yoke by the at least one sub-coil portion are in directions opposite to each other.

In the present embodiment, in particular, the at least one sub-coil portion is a first sub-coil portion 12A for driving the first yoke 31A, and a second sub-coil portion 12B for driving the second yoke 31B. The first sub-coil portion 12A surrounds at least part of the entire perimeter of the first yoke 31A as viewed from the medium facing surface 80. The second sub-coil portion 12B surrounds at least part of the entire perimeter of the second yoke 31B as viewed from the medium facing surface 80. The main coil portion 11 and the first and second sub-coil portions 12A and 12B are configured so that the magnetic field produced in the main pole 15 by the main coil portion 11 and a magnetic field produced in each of the first and second yokes 31A and 31B by the first and second sub-coil portions 12A and 12B are in directions opposite to each other.

The coil 10 includes a winding 20 constituting the main coil portion 11 and the first and second sub-coil portions 12A, 12B, and leads L1, L2. The winding 20 has a first end and a second end opposite to each other. The first end is connected to the lead L1. The second end is connected to the lead L2. The winding 20 extends to pass around the first yoke 31A, around the main pole 15, and around the second yoke 31B in alternating directions. The configurations of the main coil portion 11 and the first and second sub-coil portions 12A, 12B will be described in detail later.

The write head unit 9 further includes insulating layers 51 and 52 each formed of an insulating material. The insulating layer 51 lies on the nonmagnetic layer 73. The insulating layer 52 lies on the insulating layer 51. The insulating layers 51 and 52 are formed of alumina, for example. The first and second side shields 16A and 16B lie on the insulating layer 52 in the vicinity of the medium facing surface 80.

The main pole 15 has a top surface 15T (see FIG. 5), a bottom end 15L (see FIG. 5), a first side surface S1 and a second side surface S2 (see FIG. 6) in addition to the end face 15a. The top surface 15T lies at the trailing-side end, i.e., the front-side end in the direction T of travel of the recording medium 90. The bottom end 15L lies at the leading-side end, i.e., the rear-side end in the direction T of travel of the recording medium 90. The first side surface S1 and the second side surface S2 are located at opposite ends in the track width direction TW. The first side shield 16A has a first sidewall opposed to the first side surface S1 of the main pole 15. The second side shield 16B has a second sidewall opposed to the second side surface S2 of the main pole 15.

The write head unit 9 further includes a gap layer 53 formed of a nonmagnetic material. The gap layer 53 is disposed to extend along the first and second sidewalls of the first and second side shields 16A and 16B and the top surface of the insulating layer 52. The nonmagnetic material used to form the gap layer 53 may be an insulating material or a nonmagnetic metal material. Alumina is an example of an insulating material that can be used to form the gap layer 53. Ru is an example of a nonmagnetic metal material that can be used to form the gap layer 53.

The main pole 15 lies above the top surface of the insulating layer 52. The gap layer 53 is interposed between the main pole 15 and the top surface of the insulating layer 52. As shown in FIG. 6, the gap layer 53 is interposed also between the first side surface S1 of the main pole 15 and the first sidewall of the first side shield 16A, and between the second side surface S2 of the main pole 15 and the second sidewall of the second side shield 16B.

The main pole 15 is formed of a magnetic metal material. The material of the main pole 15 may be, for example, NiFe, CoNiFe, or CoFe.

The first and second yokes 31A and 31B are located farther from the medium facing surface 80 than are the first and second side shields 16A, 16B and lie on the insulating layer 52. The first and second yokes 31A and 31B are each spaced from the main pole 15 so that a space through which part of the coil 10 passes is defined between the main pole 15 and each of the first and second yokes 31A and 31B.

The write head unit 9 further includes a coupling section 32 lying on the insulating layer 52. The coupling section 32 couples a portion of the main pole 15 apart from the medium facing surface 80 and a portion of the at least one yoke apart from the medium facing surface 80 to each other. In the present embodiment, in particular, the coupling section 32 couples a portion of the main pole 15 apart from the medium facing surface 80, a portion of the first yoke 31A apart from the medium facing surface 80, and a portion of the second yoke 31B apart from the medium facing surface 80 to each other. In FIG. 1 the boundary between the main pole 15 and the coupling section 32 is indicated in a dotted line.

The coupling section 32 is formed of a magnetic material. For example, one of CoFeN, CoNiFe, FeNi, and CoFe can be used as the material of the coupling section 32.

The write head unit 9 further includes an insulating layer 54 formed of an insulating material and disposed around the main pole 15, the first side shield 16A, the second side shield 16B, the first yoke 31A, the second yoke 31B and the coupling section 32. The insulating layer 54 is formed of alumina, for example.

The write head unit 9 further includes insulating layers 55 and 56 each formed of an insulating material. The insulating layer 55 lies on the main pole 15, the first side shield 16A, the second side shield 16B, the first yoke 31A, the second yoke 31B and the insulating layer 54. The insulating layer 56 lies on the insulating layer 55. The insulating layers 55 and 56 are formed of alumina, for example.

The winding 20 of the coil 10 is embedded in the insulating layers 51, 52 and 54 to 56. The leads L1 and L2 are embedded in the insulating layer 51.

As shown in FIG. 5 and FIG. 6, the magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the coil 10, the main pole 15, the write shield 16, the first yoke 31A, the second yoke 31B, and the coupling section 32. The write shield 16 includes the first and second side shields 16A and 16B. The main pole 15, the first side shield 16A, the second side shield 16B, the first yoke 31A, the second yoke 31B and the coupling section 32 may be formed of separate magnetic layers. Alternatively, two or more of the above-listed components may be formed of a single magnetic layer.

The first and second side shields 16A and 16B capture a disturbance magnetic field applied to the magnetic head from the outside thereof. This makes it possible to prevent the disturbance magnetic field from being intensively captured into the main pole 15 and thereby causing erroneous writing on the recording medium 90. The first and second side shields 16A and 16B also have the function of capturing a magnetic flux that is produced from the end face 15a of the main pole 15 and spreads in the track width direction TW, and thereby preventing the magnetic flux from reaching the recording medium 90. As a result, it becomes possible to sharpen the distribution of strength of the write magnetic field in the track width direction. This in turn makes it possible to reduce the track width and thereby increase the track density. Further, the sharpened distribution of strength of the write magnetic field in the track width direction allows for the formation of a magnetization transition region into a shape approximating a rectilinear shape, rather than a curved shape, on the recording medium 90. It is thereby possible to achieve higher linear recording density. Further, the first and second side shields 16A and 16B, the first and second yokes 31A and 31B, and the coupling section 32 have the function of allowing a magnetic flux that has been produced from the end face 15a of the main pole 15 and has magnetized a portion of the recording medium 90 to flow back to the main pole 15.

Now, the coil 10 will be described in detail with reference to FIG. 1 to FIG. 6. As described previously, the winding 20 of the coil 10 extends to pass around the first yoke 31A, around the main pole 15, and around the second yoke 31B in alternating directions. The shape of the winding 20 will be specifically described below. For description of the shape of the winding 20, the first end of the winding 20 is taken as the starting point, and the second end of the winding 20 is taken as the endpoint. As shown in FIG. 1, when viewed from the medium facing surface 80, the winding 20, starting from the first end, passes clockwise around the first yoke 31A less than once, then passes counterclockwise around the main pole 15 less than once, then passes clockwise around the second yoke 31B once or more, then passes counterclockwise around the main pole 15 less than once, and finally passes clockwise around the first yoke 31A less than once to the second end.

As shown in FIG. 2 to FIG. 4, the winding 20 includes a first dedicated portion D1, a first common portion C1, a second dedicated portion D2, a second common portion C2, a third dedicated portion D3, a third common portion C3, a fourth dedicated portion D4, a fourth common portion C4 and a fifth dedicated portion D5 connected in series in this order from the first end to the second end. The first dedicated portion D1 is connected to the lead L1. The fifth dedicated portion D5 is connected to the lead L2. In FIG. 2 to FIG. 4 the boundaries between these plurality of portions are indicated in dotted lines. For ease of understanding, in FIG. 2 to FIG. 4, a portion from the lead L1 to a part of the third dedicated portion D3 and a portion from the remainder of the third dedicated portion D3 to the lead L2 are depicted as if they were separated from each other. The arrangement of the plurality of portions listed above will be described below.

The first dedicated portion D1 is located around the first yoke 31A. In the present embodiment, the first dedicated portion D1 extends along a part of the periphery of the first yoke 31A located opposite from the main pole 15 and a part of the periphery of the first yoke 31A located at the trailing side end. The insulating layers 54 and 55 are interposed between the first dedicated portion D1 and the first yoke 31A.

The first common portion C1 extends to pass through between the main pole 15 and the first yoke 31A. The insulating layer 54 is interposed between the first common portion C1 and each of the main pole 15 and the first yoke 31A.

The second dedicated portion D2 is located around the main pole 15. In the present embodiment, the second dedicated portion D2 is located below the bottom end 15L of the main pole 15 and extends in the track width direction TW. The insulating layer 52 and the gap layer 53 are interposed between the second dedicated portion D2 and the mail pole 15.

The second common portion C2 extends to pass through between the main pole 15 and the second yoke 31B. The insulating layer 54 is interposed between the second common portion C2 and each of the main pole 15 and the second yoke 31B.

The third dedicated portion D3 is located around the second yoke 31B. In the present embodiment, the third dedicated portion D3 extends along a part of the periphery of the second yoke 31B located at the trailing side end, a part of the periphery of the second yoke 31B located opposite from the main pole 15 and a part of the periphery of the second yoke 31B located at the leading side end. The insulating layers 52, 54 and 55 are interposed between the third dedicated portion D3 and the second yoke 31B.

The third common portion C3 extends to pass through between the main pole 15 and the second yoke 31B. In the present embodiment, the third common portion C3 is located closer to the medium facing surface 80 than is the second common portion C2. The insulating layer 54 is interposed between the third common portion C3 and each of the main pole 15 and the second yoke 31B.

The fourth dedicated portion D4 is located around the main pole 15. In the present embodiment, the fourth dedicated portion D4 lies above the top face 15T of the main pole 15 and extends in the track width direction TW. The fourth dedicated portion D4 is located closer to the medium facing surface 80 than is the second dedicated portion D2. The insulating layer 55 is interposed between the fourth dedicated portion D4 and the mail pole 15.

The fourth common portion C4 extends to pass through between the main pole 15 and the first yoke 31A. In the present embodiment, the fourth common portion C4 is located closer to the medium facing surface 80 than is the first common portion C1. The insulating layer 54 is interposed between the fourth common portion C4 and each of the main pole 15 and the first yoke 31A.

The fifth dedicated portion D5 is located around the first yoke 31A. In the present embodiment, the fifth dedicated portion D5 is located on the leading side of the first yoke 31A and extends in the track width direction TW. The fifth dedicated portion D5 is located closer to the medium facing surface 80 than is the first dedicated portion D1. The insulating layer 52 is interposed between the fifth dedicated portion D5 and the first yoke 31A.

As shown in FIG. 2, the main coil portion 11 includes the first common portion C1, the second dedicated portion D2, the second common portion C2, the third common portion C3, the fourth dedicated portion D4 and the fourth common portion C4. The first common portion C1, the second dedicated portion D2 and the second common portion C2 surround approximately ¾ of the entire perimeter of the main pole 15. The third common portion C3, the fourth dedicated portion D4 and the fourth common portion C4 surround approximately ¾ of the entire perimeter of the main pole 15. Thus, the main coil portion 11 is of approximately 1.5 turn.

As shown in FIG. 3, the first sub-coil portion 12A includes the first dedicated portion D1, the first common portion C1, the fourth common portion C4 and the fifth dedicated portion D5. The first dedicated portion D1 and the first common portion C1 surround approximately ¾ of the entire perimeter of the first yoke 31A. The fourth common portion C4 and the fifth dedicated portion D5 surround approximately ½ of the entire perimeter of the first yoke 31A. Thus, the first sub-coil portion 12A is of approximately 1.25 turn.

As shown in FIG. 4, the second sub-coil portion 12B includes the second common portion C2, the third dedicated portion D3 and the third common portion C3. The second common portion C2 and the part of the third dedicated portion D3 surround approximately ¾ of the entire perimeter of the second yoke 31B. The remainder of the third dedicated portion D3 and the third common portion C3 surround approximately ½ of the entire perimeter of the second yoke 31B. Thus, the second sub-coil portion 12B is of approximately 1.25 turn.

The first common portion C1 and the fourth common portion C4 are used in common to form part of the main coil portion 11 and part of the first sub-coil portion 12A. The second common portion C2 and the third common portion C3 are used in common to form another part of the main coil portion 11 and part of the second sub-coil portion 12B. The second and fourth dedicated portions D2 and D4 are used to form the remainder of the main coil portion 11. The first and fifth dedicated portions D1 and D5 are used to form the remainder of the first sub-coil portion 12A. The third dedicated portion D3 is used to form the remainder of the second sub-coil portion 12B.

In FIG. 1, the arrows in the coil 10 indicate the direction of electric current flowing through the coil 10 at some point in time. As shown in FIG. 1, the direction of the electric current flowing around the main pole 15 via the main coil portion 11 is opposite to the direction of the electric current flowing around the first yoke 31A via the first sub-coil portion 12A and the electric current flowing around the second yoke 31B via the second sub-coil portion 12B. Thus, the direction of the magnetic field generated in the main pole 15 by the main coil portion 11 is opposite to the direction of the magnetic field generated in the first yoke 31A by the first sub-coil portion 12A and the magnetic field generated in the second yoke 31B by the second sub-coil portion 12B.

An example of the shape of the main pole 15 will now be described with reference to FIG. 1, FIG. 5 and FIG. 6. As shown in FIG. 1, the main pole 15 includes a narrow portion 15A and a wide portion 15B. The narrow portion 15A has the end face 15a and an end opposite to the end face 15a. The wide portion 15B is connected to the end of the narrow portion 15A. As shown in FIG. 5 and FIG. 6, the main pole 15 has the top surface 15T, the bottom end 15L, the first side surface S1 and the second side surface S2. The width of the top surface 15T in the track width direction TW is greater in the wide portion 15B than in the narrow portion 15A.

In the narrow portion 15A, the width of the top surface 15T in the track width direction TW is generally constant regardless of distance from the medium facing surface 80. In the wide portion 15B, the width of the top surface 15T in the track width direction TW is, for example, equal to that in the narrow portion 15A at the boundary between the narrow portion 15A and the wide portion 15B, and gradually increases with increasing distance from the medium facing surface 80, then becoming constant. The length of the narrow portion 15A in a direction perpendicular to the medium facing surface 80 will be referred to as the neck height. The neck height falls within the range of 0 to 0.3 μm, for example. A zero neck height means that the narrow portion 15A is not present and the wide portion 15B thus has the end face 15a.

The end face 15a of the main pole 15 has a first side in contact with the insulating layer 55, a second side connected to one end of the first side, and a third side connected to the other end of the first side. The first side defines the track width. The position of an end of a record bit to be recorded on the recording medium 90 is determined by the position of the first side. The width of the end face 15a of the main pole 15 in the track width direction TW decreases with increasing distance from the first side, that is, with decreasing distance to the top surface 1a of the substrate 1. Each of the second side and the third side forms an angle of, for example, 7° to 17°, or preferably 10° to 15°, with respect to a direction perpendicular to the top surface 1a of the substrate 1. The first side has a length in the range of 0.05 to 0.20 μm, for example.

Now, functions and effects unique to the magnetic head according to the present embodiment will be described. In the present embodiment, the coil 10 includes the main coil portion 11 for driving the main pole 15, the first sub-coil portion 12A for driving the first yoke 31A, and the second sub-coil portion 12B for driving the second yoke 31B. According to the present embodiment, this configuration allows the magnetization reversal of each of the main pole 15, the first yoke 31A and the second yoke 31B to be faster than in the case where the main pole 15, the first yoke 31A and the second yoke 31B are driven by a single helical coil.

The winding 20 includes the first to fourth common portions C1 to C4. The first common portion C1 and the fourth common portion C4 are used in common to form part of the main coil portion 11 and part of the first sub-coil portion 12A. The second common portion C2 and the third common portion C3 are used in common to form another part of the main coil portion 11 and the part of the second sub-coil portion 12B. By virtue of this feature, the present embodiment makes it possible for each of the main coil portion 11 and the first and second sub-coil portions 12A and 12B to provide a sufficiently increased magnetomotive force without the need for an increase in the number of turns of each of the main coil portion 11 and the first and second sub-coil portions 12A and 12B.

Further, according to the present embodiment, since the winding 20 includes the first to fourth common portions C1 to C4, it is possible to reduce the length and volume of the magnetic path including the main pole 15, the write shield 16, the first yoke 31A and the second yoke 31B. This also serves to make the magnetization reversal of the main pole 15 faster.

Second Embodiment

Figure 7:
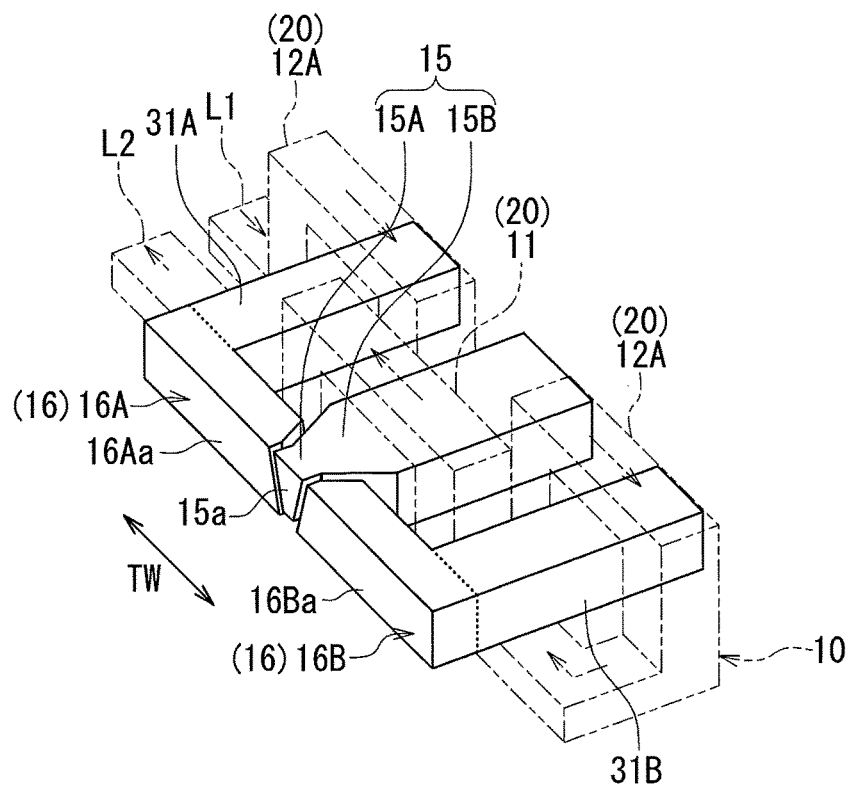
FIG. 7 is a perspective view showing the main part of a magnetic head according to a second embodiment of the invention.

A magnetic head according to a second embodiment of the present invention will now be described with reference to FIG. 7. FIG. 7 is a perspective view showing the main part of the magnetic head according to the present embodiment. In FIG. 7, the arrow labeled TW indicates the track width direction.

The magnetic head according to the present embodiment differs from the magnetic head according to the first embodiment in the following ways. In the present embodiment, the coupling portion 32 of the first embodiment is omitted. Thus, the main pole 15 and the at least one yoke are separate from each other. In the present embodiment, in particular, the main pole 15, the first yoke 31A and the second yoke 31B are separate from each other.

In the present embodiment, the main pole 15, the first yoke 31A and the second yoke 31B are driven individually by the main coil portion 11, the first sub-coil portion 12A and the second sub-coil portion 12B, respectively. Thus, according to present embodiment, the main pole 15, the first yoke 31A and the second yoke 31B can generate respective desired magnetizations even though they are separate from each other, and consequently, the main pole 15 and the write shield 16 can perform their respective functions.

Further, according to the present embodiment, since the main pole 15, the first yoke 31A and the second yoke 31B separate from each other are driven individually by the main coil portion 11, the first sub-coil portion 12A and the second sub-coil portion 12B, respectively, it is possible to make the magnetization reversal of each of the main pole 15, the first yoke 31A and the second yoke 31B faster.

The remainder of configuration, function and effects of the present embodiment are similar to those of the first embodiment.

Third Embodiment

Figure 8:
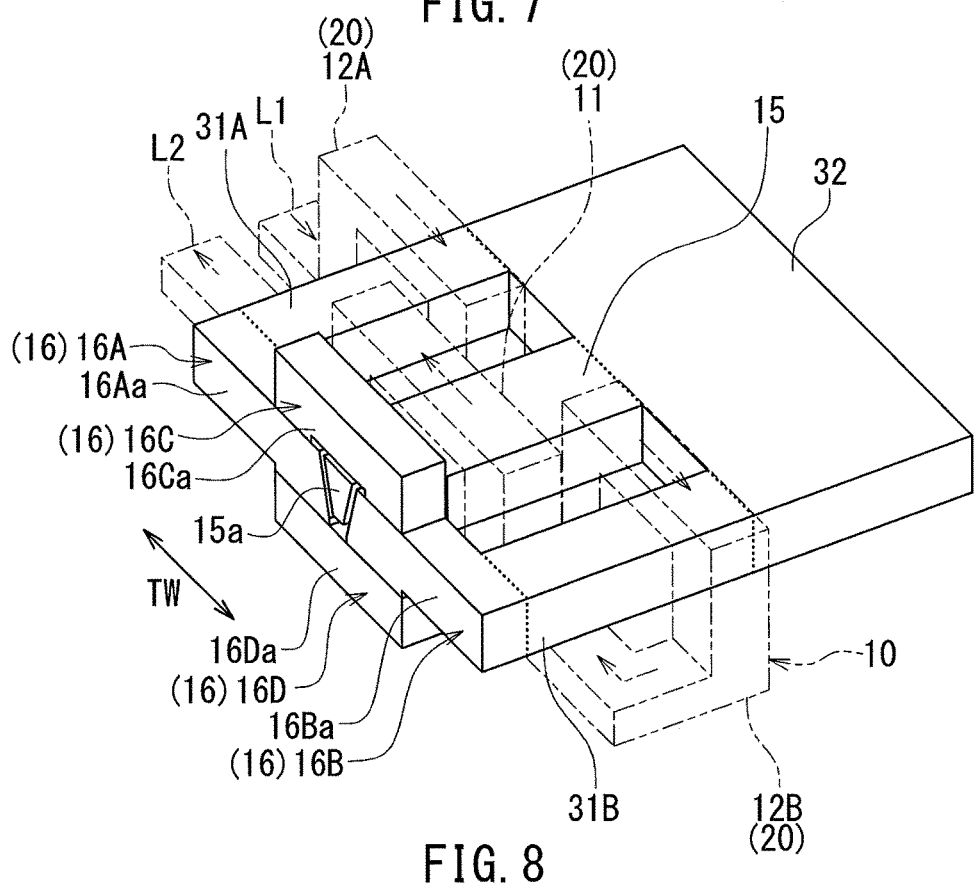
FIG. 8 is a perspective view showing the main part of a magnetic head according to a third embodiment of the invention.
Figure 9:
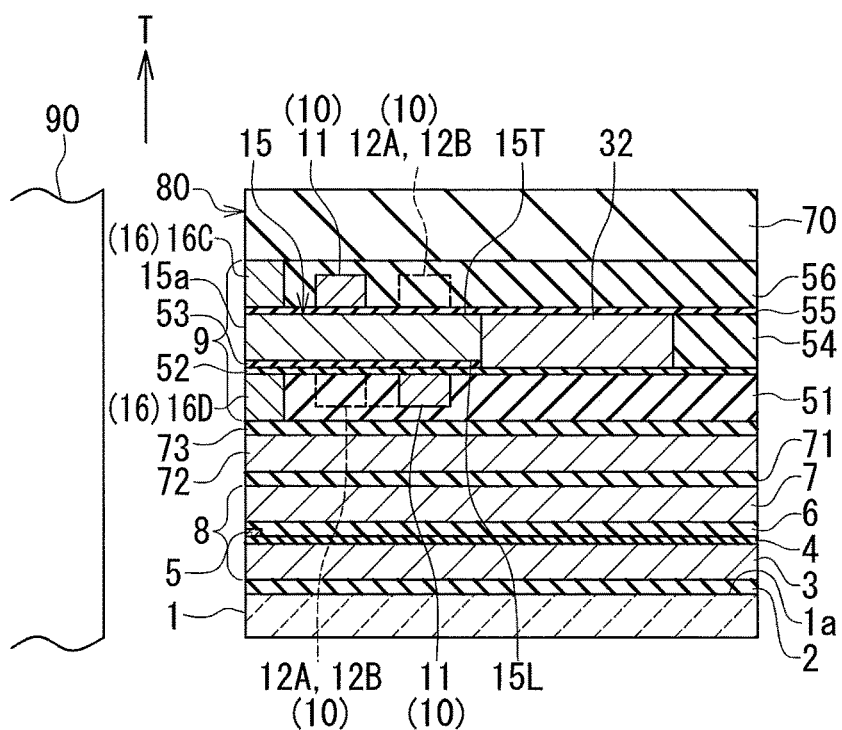
FIG. 9 is a cross-sectional view of the magnetic head according to the third embodiment of the invention.
Figure 10:
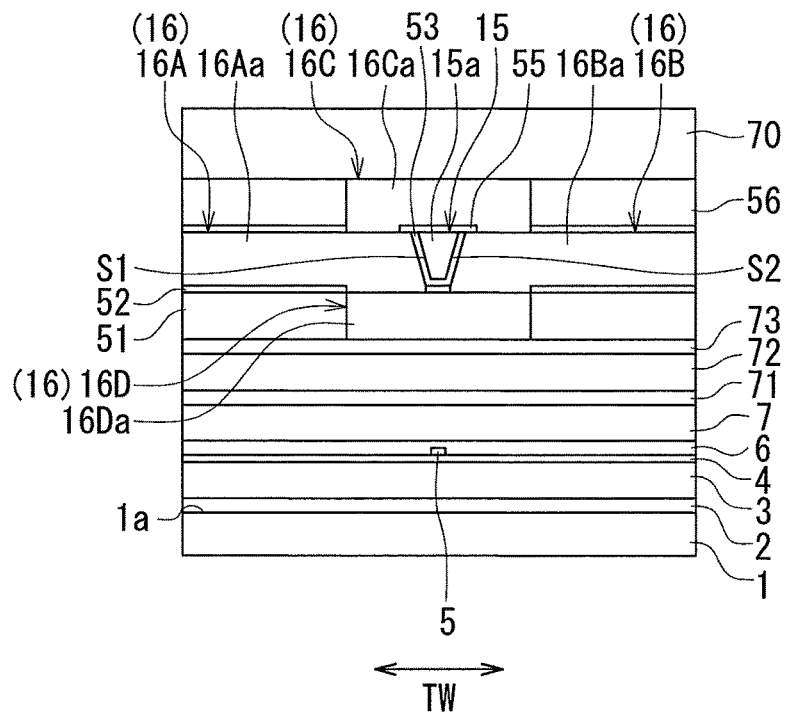
FIG. 10 is a front view showing the medium facing surface of the magnetic head according to the third embodiment of the invention.

A magnetic head according to a third embodiment of the present invention will now be described with reference to FIG. 8 to FIG. 10. FIG. 8 is a perspective view showing the main part of the magnetic head according to the present embodiment. FIG. 9 is a cross-sectional view of the magnetic head according to the present embodiment. The arrow labeled T in FIG. 9 indicates the direction of travel of the recording medium 90. FIG. 10 is a front view showing the medium facing surface 80 of the magnetic head according to the present embodiment. In FIG. 8 and FIG. 10, the arrow labeled TW indicates the track width direction.

Now, descriptions will be given of differences of the magnetic head according to the third embodiment from the magnetic head according to the first embodiment. In the present embodiment, the end face of the write shield 16 includes a third end face portion 16Ca and a fourth end face portion 16Da in addition to the first and second end face portions 16Aa and 16Ba. The third end face portion 16Ca is located on the trailing side, i.e., the front side in the direction T of travel of the recording medium 90, relative to the end face 15a of the main pole 15. The fourth end face portion 16Da is located on the leading side, i.e., the rear side in the direction T of travel of the recording medium 90, relative to the end face 15a of the main pole 15. In the medium facing surface 80, the first to fourth end face portions 16Aa, 16Ba, 16Ca, and 16Da are arranged to surround the end face 15a of the main pole 15.

In the present embodiment, the write shield 16 includes a top shield 16C and a bottom shield 16D in addition to the first and second side shields 16A and 16B. The top shield 16C is located on the trailing side, i.e., the front side in the direction T of travel of the recording medium 90, relative to the main pole 15. The bottom shield 16D is located on the leading side, i.e., the rear side in the direction T of travel of the recording medium 90, relative to the main pole 15. The top shield 16C and the bottom shield 16D magnetically connect the first side shield 16A and the second side shield 16B. The top shield 16C has the third end face portion 16Ca. The bottom shield 16D has the fourth end face portion 16Da.

The bottom shield 16D lies on the nonmagnetic layer 73 in the vicinity of the medium facing surface 80 and is embedded in the insulating layer 51. In the present embodiment, the insulating layer 52 has a first opening for exposing a part of the top surface of the bottom shield 16D and a second opening for exposing another part of the top surface of the bottom shield 16D. The first and second side shields 16A and 16B lie on the bottom shield 16D and the insulating layer 52. A part of the bottom surface of the first side shield 16A is in contact with the aforementioned part of the top surface of the bottom shield 16D through the first opening. A part of the bottom surface of the second side shield 16B is in contact with the aforementioned other part of the top surface of the bottom shield 16D through the second opening.

In the present embodiment, the insulating layer 55 has a third opening for exposing a part of the top surface of the first side shield 16A and a fourth opening for exposing a part of the top surface of the second side shield 16B. The top shield 16C lies on the first side shield 16A, the second side shield 16B and the insulating layer 55, and is embedded in the insulating layer 56. A part of the bottom surface of the top shield 16C is in contact with the aforementioned part of the top surface of the first side shield 16A through the third opening. Another part of the bottom surface of the top shield 16C is in contact with the aforementioned part of the top surface of the second side shield 16B through the fourth opening.

The top shield 16C and the bottom shield 16D capture a disturbance magnetic field applied to the magnetic head from the outside thereof. This makes it possible to prevent the disturbance magnetic field from being intensively captured into the main pole 15 and thereby causing erroneous writing on the recording medium 90. The top shield 16C and the bottom shield 16D also have the function of capturing a magnetic flux that is produced from the end face 15a of the main pole 15 and spreads in the direction T of travel of the recording medium 90, and thereby preventing the magnetic flux from reaching the recording medium 90. Furthermore, the first and second side shields 16A and 16B, the top shield 16C and the bottom shield 16D, the first and second yokes 31A and 31B, and the coupling section 32 have the function of allowing a magnetic flux that has been produced from the end face 15a of the main pole 15 and has magnetized a portion of the recording medium 90 to flow back.

In the present embodiment, the coupling section 32 may be omitted as in the second embodiment. The remainder of configuration, function and effects of the present embodiment are similar to those of the first or second embodiment.

Fourth Embodiment

Figure 11:
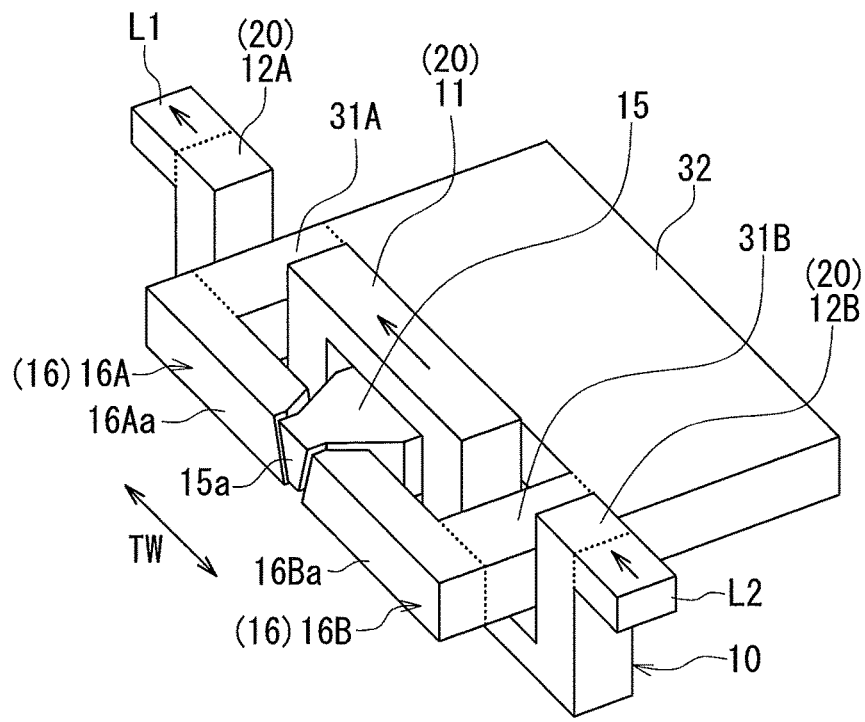
FIG. 11 is a perspective view showing the main part of a magnetic head according to a fourth embodiment of the invention.
Figure 12:
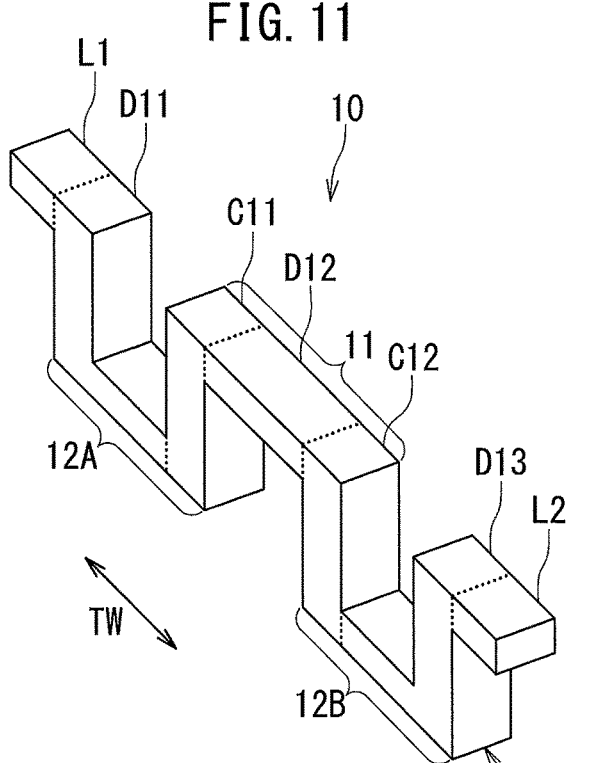
FIG. 12 is a perspective view showing a coil of the magnetic head according to the fourth embodiment of the invention.

A magnetic head according to a fourth embodiment of the present invention will now be described with reference to FIG. 11 and FIG. 12. FIG. 11 is a perspective view showing the main part of the magnetic head according to the present embodiment. FIG. 12 is a perspective view showing a coil of the present embodiment. In FIG. 11 and FIG. 12, the arrow labeled TW indicates the track width direction.

In the present embodiment, the leads L1 and L2 of the coil 10 are embedded in the insulating layer 56 (see FIG. 5). The winding 20 has a first end and a second end opposite to each other. The first end is connected to the lead L1. The second end is connected to the lead L2.

In the present embodiment, the winding 20 of the coil 10 is shaped differently than in the first embodiment. The shape of the winding 20 of the present embodiment will be described below. For description of the shape of the winding 20, the first end of the winding 20 is taken as the starting point, and the second end of the winding 20 is taken as the endpoint. As shown in FIG. 11, when viewed from the medium facing surface 80, the winding 20, starting from the first end, passes counterclockwise around the first yoke 31A less than once, then passes clockwise around the main pole 15 less than once, and finally passes counterclockwise around the second yoke 31B less than once to the second end.

The winding 20 includes a first dedicated portion D11, a first common portion C11, a second dedicated portion D12, a second common portion C12 and a third dedicated portion D13 connected in series in this order from the first end to the second end, in place of the first dedicated portion D1, the first common portion C1, the second dedicated portion D2, the second common portion C2, the third dedicated portion D3, the third common portion C3, the fourth dedicated portion D4, the fourth common portion C4 and the fifth dedicated portion D5 of the first embodiment. The first dedicated portion D11 is connected to the lead L1. The third dedicated portion D13 is connected to the lead L2. In FIG. 12 the boundaries between these plurality of portions are indicated in dotted lines. The arrangement of the plurality of portions listed above will be described below.

The first dedicated portion D11 is located around the first yoke 31A. In the present embodiment, the first dedicated portion D11 extends along a part of the periphery of the first yoke 31A located opposite from the main pole 15 and a part of the periphery of the first yoke 31A located at the leading side end. The insulating layers 52 and 54 (see FIG. 5) are interposed between the first dedicated portion D11 and the first yoke 31A.

The first common portion C11 extends to pass through between the main pole 15 and the first yoke 31A. The insulating layer 54 (see FIG. 6) is interposed between the first common portion C11 and each of the main pole 15 and the first yoke 31A.

The second dedicated portion D12 is located around the main pole 15. In the present embodiment, the second dedicated portion D12 lies above the top face 15T (see FIG. 5) of the main pole 15 and extends in the track width direction TW. The insulating layer 55 (see FIG. 5) is interposed between the second dedicated portion D12 and the mail pole 15.

The second common portion C12 extends to pass through between the main pole 15 and the second yoke 31B. The insulating layer 54 (see FIG. 5) is interposed between the second common portion C12 and each of the main pole 15 and the second yoke 31B.

The third dedicated portion D13 is located around the second yoke 31B. In the present embodiment, the third dedicated portion D13 extends along a part of the periphery of the second yoke 31B located at the leading side end and a part of the periphery of the second yoke 31B located opposite from the main pole 15. The insulating layers 52 and 54 (see FIG. 5) are interposed between the third dedicated portion D13 and the second yoke 31B.

As shown in FIG. 12, the main coil portion 11 includes the first common portion C11, the second dedicated portion D12 and the second common portion C12. The first common portion C11, the second dedicated portion D12 and the second common portion C12 surround approximately ¾ of the entire perimeter of the main pole 15. Thus, the main coil portion 11 is of approximately 0.75 turn.

As shown in FIG. 12, the first sub-coil portion 12A includes the first dedicated portion D11 and the first common portion C11. The first dedicated portion D11 and the first common portion C11 surround approximately ¾ of the entire perimeter of the first yoke 31A. Thus, the first sub-coil portion 12A is of approximately 0.75 turn.

As shown in FIG. 12, the second sub-coil portion 12B includes the second common portion C12 and the third dedicated portion D13. The second common portion C12 and the third dedicated portion D13 surround approximately ¾ of the entire perimeter of the second yoke 31B. Thus, the second sub-coil portion 12B is of approximately 0.75 turn.

The first common portion C11 is used in common to form part of the main coil portion 11 and part of the first sub-coil portion 12A. The second common portion C12 is used in common to form another part of the main coil portion 11 and part of the second sub-coil portion 12B. The second dedicated portion D12 is used to form the remainder of the main coil portion 11. The first dedicated portion D11 is used to form the remainder of the first sub-coil portion 12A. The third dedicated portion D13 is used to form the remainder of the second sub-coil portion 12B.

In FIG. 11, the arrows in the coil 10 indicate the direction of current flowing through the coil 10 at some point in time. As shown in FIG. 11, the direction of the electric current flowing around main pole 15 via the main coil portion 11 is opposite to the direction of the electric current flowing around the first yoke 31A via the first sub-coil portion 12A and the electric current flowing around the second yoke 31B via the second sub-coil portion 12B. Thus, the direction of the magnetic field generated in the main pole 15 by the main coil portion 11 is opposite to the direction of the magnetic field generated in the first yoke 31A by the first sub-coil portion 12A and the magnetic field generated in the second yoke 31B by the second sub-coil portion 12B.

In the present embodiment, the coupling section 32 may be omitted as in the second embodiment. Further, as in the third embodiment, the top shield 16C and the bottom shield 16D may be provided. The remainder of configuration, function and effects of the present embodiment are similar to those of any of the first to third embodiments.

Fifth Embodiment

Figure 13:
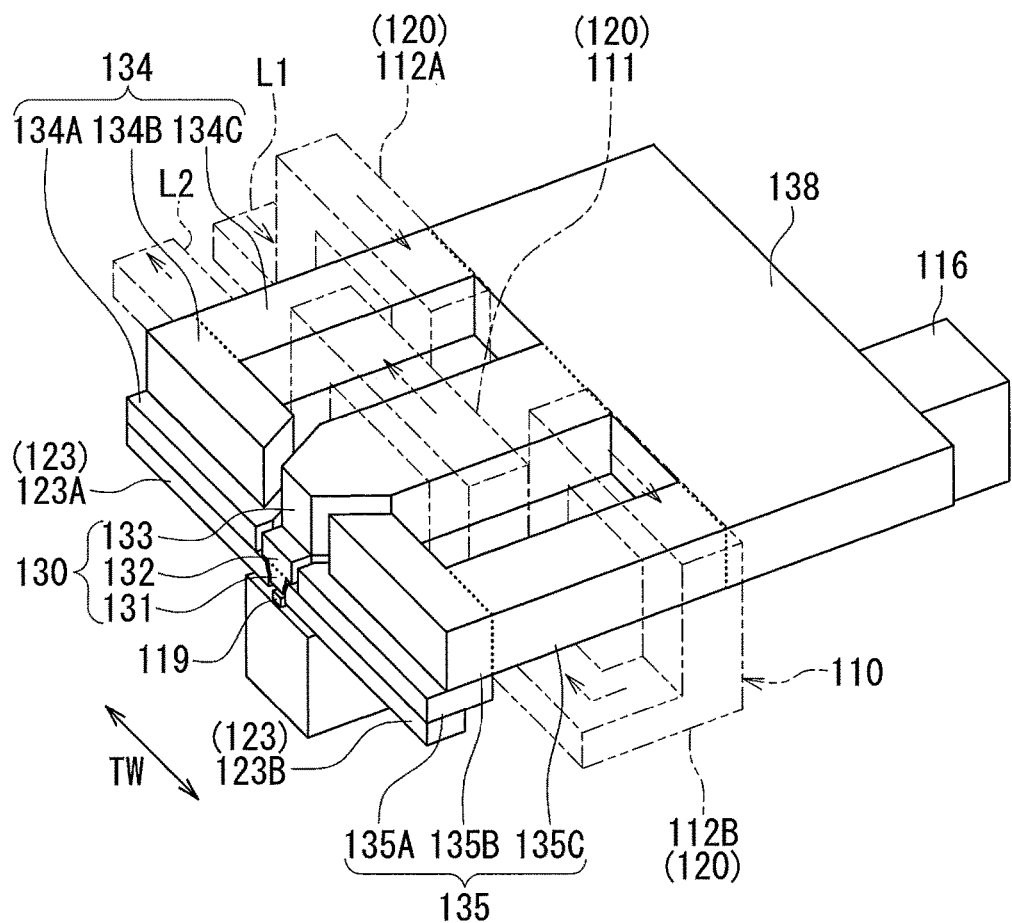
FIG. 13 is a perspective view showing the main part of a magnetic head according to a fifth embodiment of the invention.
Figure 14:
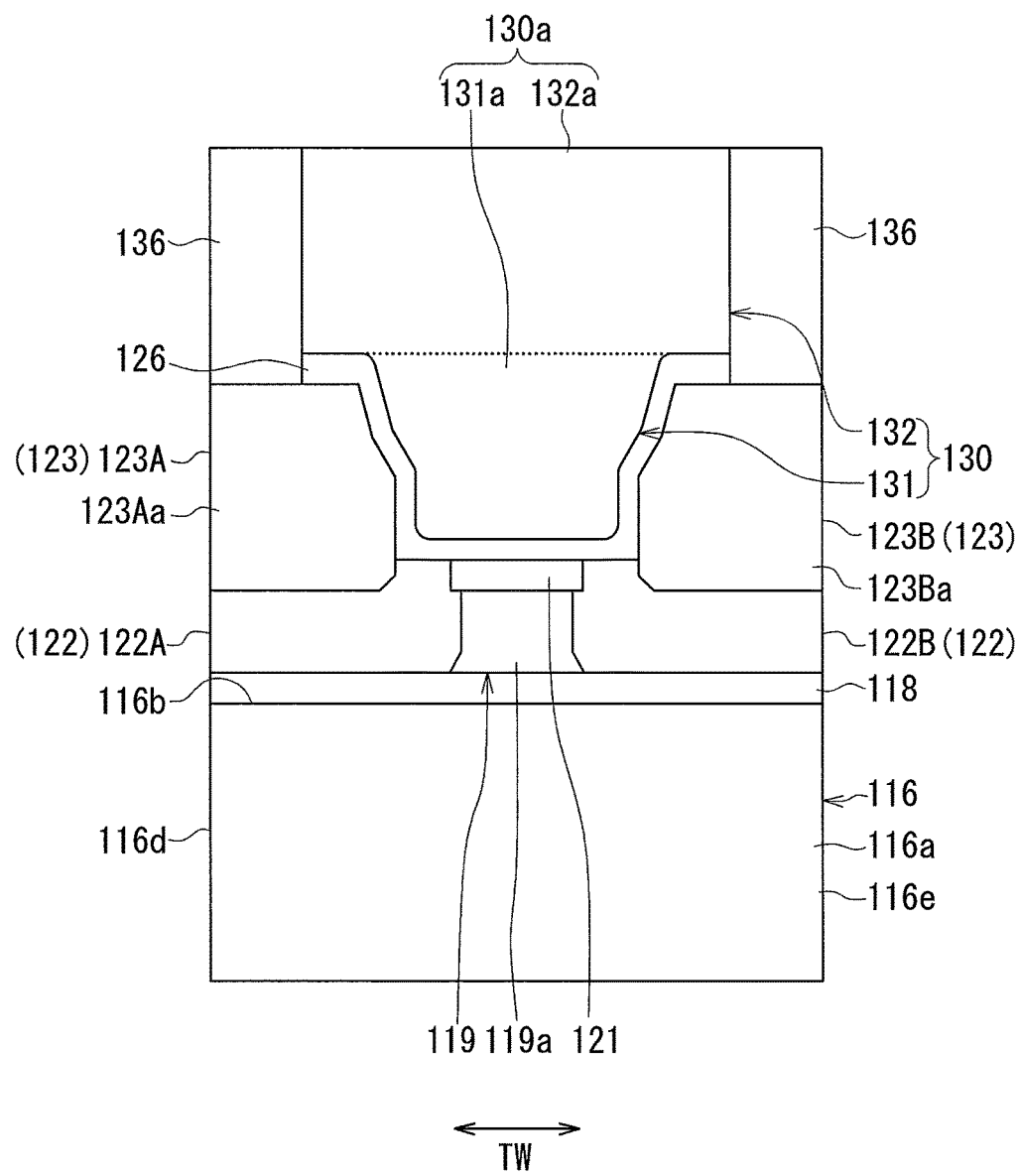
FIG. 14 is a front view showing the main part of a magnetic head according to the fifth embodiment of the invention.
Figure 15:
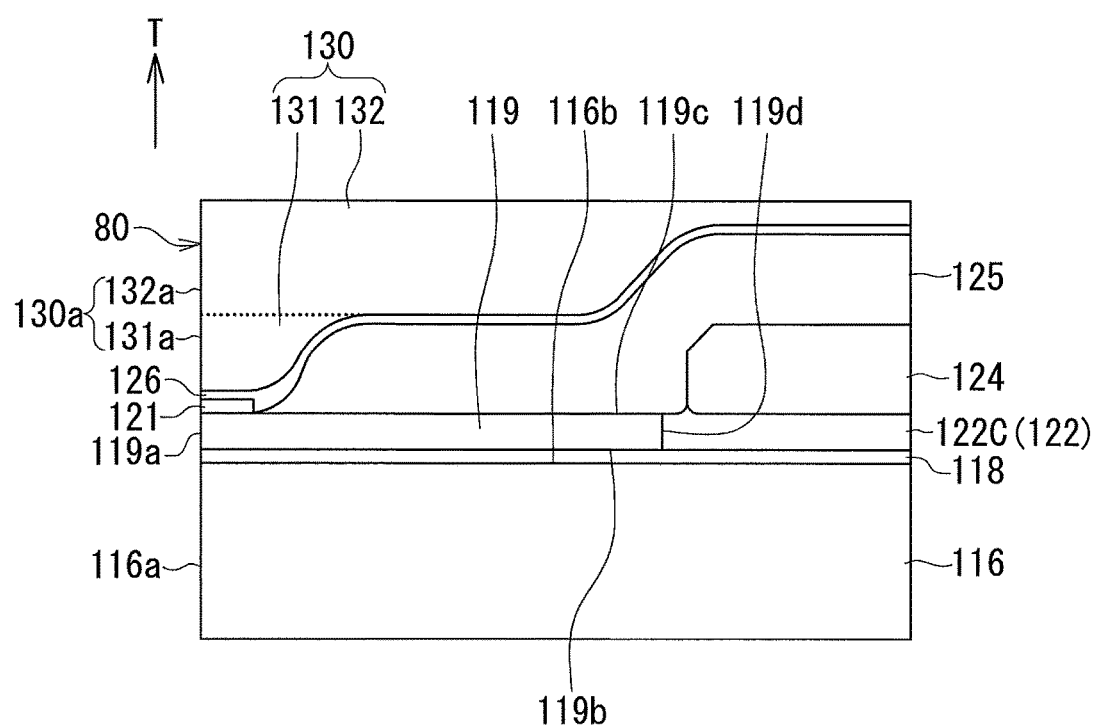
FIG. 15 is a cross-sectional view showing the main part of a magnetic head according to the fifth embodiment of the invention.

A magnetic head according to a fifth embodiment of the present invention will now be described with reference to FIG. 13 to FIG. 19. FIG. 13 is a perspective view showing the main part of the magnetic head according to the present embodiment. FIG. 14 is a front view showing the main part of the magnetic head according to the present embodiment. FIG. 15 is a cross-sectional view showing the main part of the magnetic head according to the present embodiment.

Figure 16:
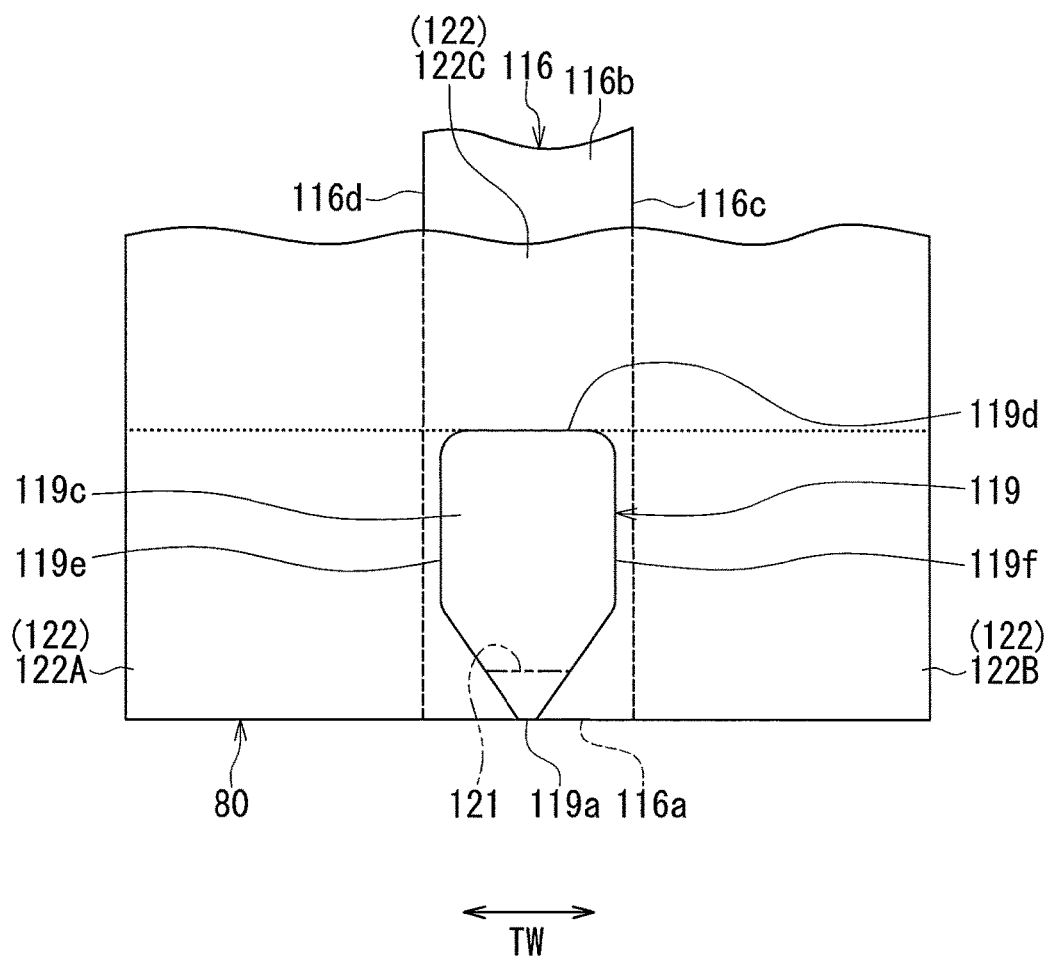
FIG. 16 is a plan view showing a core, a plasmon generator, and a gap film of the fifth embodiment of the invention.
Figure 17:
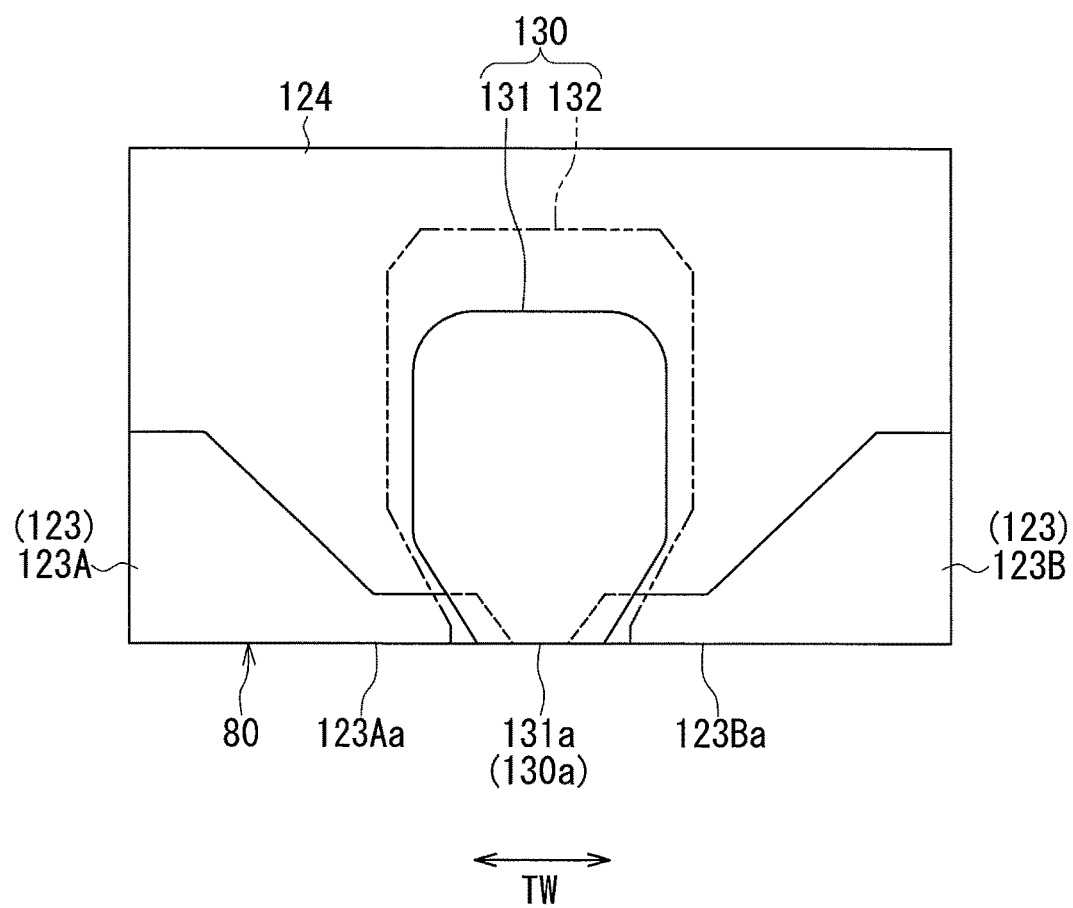
FIG. 17 is a plan view showing a main pole, a write shield, and a first heat sink of the fifth embodiment of the invention.
Figure 18:
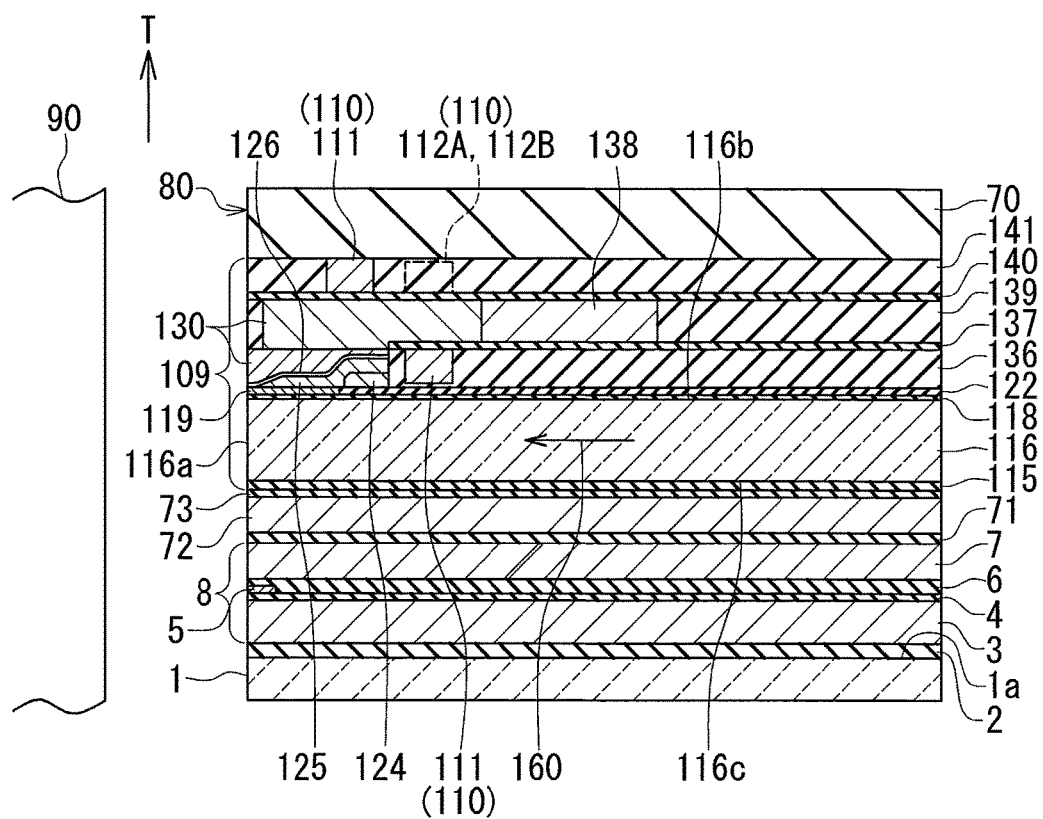
FIG. 18 is a cross-sectional view of the magnetic head according to the fifth embodiment of the invention.
Figure 19:
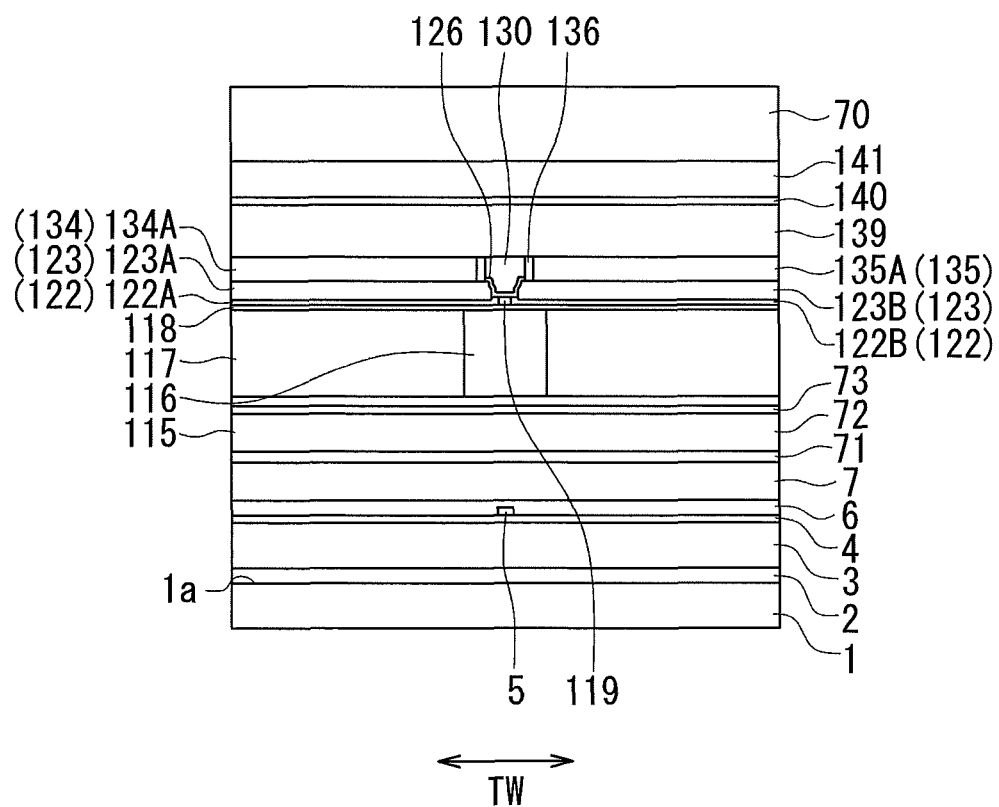
FIG. 19 is a front view showing the medium facing surface of the magnetic head according to the fifth embodiment of the invention.

FIG. 16 is a plan view showing a core, a plasmon generator, and a gap film. FIG. 17 is a plan view showing a main pole, a write shield, and a first heat sink. FIG. 18 is a cross-sectional view of the magnetic head according to the present embodiment. FIG. 19 is a front view showing the medium facing surface of the magnetic head according to the present embodiment. In FIG. 13, FIG. 14, FIG. 16, FIG. 17 and FIG. 19, the arrow labeled TW indicates the track width direction. The arrow labeled T in FIG. 15 and FIG. 18 indicates the direction of travel of a recording medium 90.

The magnetic head according to the present embodiment is for use in thermally-assisted magnetic recording. Thermally-assisted magnetic recording uses a recording medium 90 having high coercivity. When writing data, a write magnetic field and heat are simultaneously applied to the area of the recording medium 90 where to write data, so that the area rises in temperature and drops in coercivity for data writing. The area where data is written subsequently falls in temperature and rises in coercivity to increase the thermal stability of magnetization.

The magnetic head according to the present embodiment includes a write head unit 109 in place of the write head unit 9 of the first embodiment. The write head unit 109 lies on the nonmagnetic layer 73. The write head unit 109 includes a coil 110 and a main pole 130. The coil 110 produces a magnetic field corresponding to data to be written on the recording medium 90. As shown in FIG. 14, FIG. 15 and FIG. 17, the main pole 130 has an end face 130a located in the medium facing surface 80. The main pole 130 passes a magnetic flux corresponding to the magnetic field produced by the coil 110, and produces a write magnetic field for use to write data on the recording medium 90 by means of a perpendicular magnetic recording system. FIG. 15 and FIG. 18 show a cross section that intersects the end face 130a of the main pole 130 and that is perpendicular to the medium facing surface 80 and to the top surface 1a of the substrate 1. The coil 110 is formed of a conductive material such as copper.

The write head unit 109 further includes a write shield 123 formed of a magnetic material. For example, one of CoFeN, CoNiFe, FeNi, and CoFe can be used as the material of the write shield 123. The write shield 123 has an end face located in the medium facing surface 80. The end face of the write shield 123 includes a first side shield end face 123Aa and a second side shield end face 123Ba. The first and second side shield end faces 123Aa and 123Ba are located on opposite sides of the end face 130a of the main pole 130 in the track width direction TW.

The write shield 123 includes a first side shield 123A and a second side shield 123B located on opposite sides of the main pole 130 in the track width direction TW. The first side shield 123A has the first side shield end face 123Aa. The second side shield 123B has the second side shield end face 123Ba.

The write head unit 109 further includes a first yoke 134 and a second yoke 135 located on opposite sides of the main pole 130 in the track width direction TW. The first yoke 134 is connected to the first side shield 123A. The second yoke 135 is connected to the second side shield 123B. For example, one of CoFeN, CoNiFe, FeNi, and CoFe can be used as the material of the first and second yokes 134 and 135.

The coil 110 includes a main coil portion 111 for driving the main pole 130, a first sub-coil portion 112A for driving the first yoke 134, and the second sub-coil portion 112B for driving the second yoke 135. The main coil portion 111 surrounds at least part of the entire perimeter of the main pole 130 as viewed from the medium facing surface 80. The first sub-coil portion 112A surrounds at least part of the entire perimeter of the first yoke 134 as viewed from the medium facing surface 80. The second sub-coil portion 112B surrounds at least part of the entire perimeter of the second yoke 135 as viewed from the medium facing surface 80. The main coil portion 111 and the first and second sub-coil portions 112A and 112B are configured so that the magnetic field produced in the main pole 130 by the main coil portion 111 and a magnetic field produced in each of the first and second yokes 134 and 135 by the first and second sub-coil portions 112A and 112B are in directions opposite to each other.

The coil 110 includes a winding 120 constituting the main coil portion 111 and the first and second sub-coil portions 112A, 112B, and leads L1, L2. The winding 120 has a first end and a second end opposite to each other. The first end is connected to the lead L1. The second end is connected to the lead L2. The winding 120 extends to pass around the first yoke 134, around the main pole 130, and around the second yoke 135 in alternating directions. The configurations of the main coil portion 111 and the first and second sub-coil portions 112A, 112B will be described in detail later.

The write head unit 109 further includes a waveguide including a core 116 and a cladding, the core 116 allowing light to propagate therethrough, the cladding being provided around the core 116. As shown in FIGS. 14 to 16 and FIG. 18 in particular, the core 116 has a front end face 116a facing toward the medium facing surface 80, an evanescent light generating surface 116b which is a top surface, a bottom surface 116c, and two side surfaces 116d and 116e. The front end face 116a may be located in the medium facing surface 80 or at a distance from the medium facing surface 80. FIGS. 13 to 16, FIG. 18, and FIG. 19 show an example in which the front end face 116a is located in the medium facing surface 80.

The cladding includes cladding layers 115, 117 and 118. The cladding layer 115 lies on the nonmagnetic layer 73. The core 116 lies on the cladding layer 115. The cladding layer 117 lies on the cladding layer 115 and surrounds the core 116. The cladding layer 118 is disposed over the evanescent light generating surface 116b of the core 116 and the top surface of the cladding layer 117.

The core 116 is formed of a dielectric material that transmits laser light to be used for generating near-field light. The laser light emitted from a non-illustrated laser diode enters the core 116 and propagates through the core 116. The cladding layers 115, 117 and 118 are each formed of a dielectric material that has a refractive index lower than that of the core 116. For example, the core 116 may be formed of tantalum oxide such as $Ta_2O_5$ or silicon oxynitride (SiON), whereas the cladding layers 115, 117 and 118 may be formed of silicon oxide ($SiO_2$) or alumina.

The write head unit 109 further includes a plasmon generator 119 lying on the cladding layer 118 in the vicinity of the medium facing surface 80, and an insulating film 121 lying on a portion of the plasmon generator 119 in the vicinity of the medium facing surface 80. FIGS. 18 and 19 omit the illustration of the insulating film 121. The plasmon generator 119 is configured to excite surface plasmons on the principle to be described later. The plasmon generator 119 is formed of, for example, one of Au, Ag, Al, Cu, Pd, Pt, Rh and Ir, or an alloy composed of two or more of these elements. The insulating film 121 is formed of silicon oxide, for example. The shape of the plasmon generator 119 will be described in detail later.

The write head unit 109 further includes a gap film 122 formed of an insulating material, the gap film 122 lying on the cladding layer 118 and surrounding the plasmon generator 119 and the insulating film 121. As shown in FIG. 14 to FIG. 16, the gap film 122 includes a first portion 122A, a second portion 122B and a third portion 122C. The first portion 122A and the second portion 122B are located on opposite sides of the plasmon generator 119 in the track width direction TW. Each of the first portion 122A and the second portion 122B has an end face located in the medium facing surface 80. The third portion 122C is located farther from the medium facing surface 80 than is the plasmon generator 119. In FIG. 16, the boundary between the third portion 122C and the first and second portions 122A, 122B is indicated in a dotted line. The gap film 122 is formed of alumina, for example.

The write shield 123 lies on a part of the gap film 122 in the vicinity of the medium facing surface 80. As shown in FIG. 14, the gap film 122 separates the plasmon generator 119 from the write shield 123. As shown in FIG. 14 and FIG. 19, the first side shield 123A of the write shield 123 lies on the first portion 122A of the gap film 122. The second side shield 123B of the write shield 123 lies on the second portion 122B of the gap film 122.

The write head unit 109 further includes a first heat sink 124 lying on another portion of the gap film 122 apart from the medium facing surface 80, and a second heat sink 125 located away from the medium facing surface 80 and lying on the plasmon generator 119 and the first heat sink 124. The first and second heat sinks 124 and 125 are formed of Au or Cu, for example.

The main pole 130 is located on the front side in the direction T of travel of the recording medium 90 relative to the core 116. The plasmon generator 119 is located between the core 116 and the main pole 130. The write head unit 109 further includes a separating film 126 formed of a nonmagnetic material and lying on the insulating film 121, the gap film 122, the write shield 123 and the second heat sink 125. Part of the main pole 130 lies on the separating film 126. As shown in FIG. 14 and FIG. 19, the separating film 126 separates the main pole 130 from the write shield 123. As shown in FIG. 14, FIG. 15, FIG. 18 and FIG. 19, the separating film 126 is a single continuous film, and at least part of the separating film 126 is interposed between the main pole 130 and the plasmon generator 119, between the main pole 130 and the write shield 123, and between the main pole 130 and the gap film 122. As shown in FIG. 14 and FIG. 15, the insulating film 121 is interposed between the separating film 126 and the plasmon generator 119 in the vicinity of the medium facing surface 80. As shown in FIG. 15, the separating film 126 also includes a portion interposed between the main pole 130 and the second heat sink 125.

The nonmagnetic material used to form the separating film 126 may be an insulating material or a nonmagnetic metal material. An example of an insulating material that can be used to form the separating film 126 is alumina or silicon oxide. An example of a nonmagnetic metal material that can be used to form the separating film 126 is Ru or Rh. In the present embodiment, the separating film 126 is formed of a nonmagnetic metal material, in particular.

The main pole 130 includes a first portion 131, a second portion 132 and a third portion 133. Part of the first portion 131 is located between the first side shield 123A and the second side shield 123B of the write shield 123. The second portion 132 is located on the front side in the direction T of travel of the recording medium 90 relative to the first portion 131. The third portion 133 is located on the front side in the direction T of travel of the recording medium 90 relative to the first and second portions 131 and 132. In FIG. 14 and FIG. 15, the boundary between the first portion 131 and the second portion 132 is indicated by a dotted line. Part of the second portion 132 lies over the write shield 123 with the separating film 126 interposed between the part of the second portion 132 and the write shield 123.

The first yoke 134 includes a first portion 134A, a second portion 134B and a third portion 134C. The second yoke 135 includes a first portion 135A, a second portion 135B and a third portion 135C. In FIG. 13 the boundary between the second portion 134B and the third portion 134C and the boundary between the second portion 135B and the third portion 135C are shown by dotted lines. In the example shown in FIG. 13, the first portions 134A and 135A and the second portions 134B and 135B are each shaped to be elongated in the track width direction TW. The third portions 134C and 135C are each shaped to be elongated in the direction perpendicular to the medium facing surface 80. The first portion 134A of the first yoke 134 lies on the first side shield 123A. The first portion 135A of the second yoke 135 lies on the second side shield 123B. The first portion 134A of the first yoke 134 and the first portion 135A of the second yoke 135 are located on opposite sides of the second portion 132 of the main pole 130 in the track width direction TW. Each of the first portion 134A of the first yoke 134 and the first portion 135A of the second yoke 135 has an end face located in the medium facing surface 80.

The write head unit 109 further includes insulating layers 136 and 137 each formed of an insulating material. The insulating layer 136 surrounds the first and second side shields 123A and 123B of the write shield 123, the first and second heat sinks 124 and 125, the first and second portions 131 and 132 of the main pole 130, the first portion 134A of the first yoke 134 and the first portion 135A of the second yoke 135. The insulating layer 137 lies on the insulating layer 136. The insulating layers 136 and 137 are formed of alumina, for example.

The third portion 133 of the main pole 130 lies on the second portion 132 of the main pole 130 and the insulating layer 137. The second portion 134B of the first yoke 134 lies on the first portion 134A of the first yoke 134. The second portion 135B of the second yoke 135 lies on the first portion 135A of the second yoke 135. The second portion 134B of the first yoke 134 and the second portion 135B of the second yoke 135 are located on opposite sides of the third portion 133 of the main pole 130 in the track width direction TW. Each of the third portion 133 of the main pole 130, the second portion 134B of the first yoke 134 and the second portion 135B of the second yoke 135 has an end facing toward the medium facing surface 80 and located at a distance from the medium facing surface 80.

The third portion 134C of the first yoke 134 lies on the insulating layer 137 and is connected to the second portion 134B of the first yoke 134, being located farther from the medium facing surface 80 than is the second portion 134B. The third portion 135C of the second yoke 135 lies on the insulating layer 137 and is connected to the second portion 135B of the second yoke 135, being located farther from the medium facing surface 80 than is the second portion 135B. The third portion 134C of the first yoke 134 and the third portion 135C of the second yoke 135 are each spaced from the third portion 133 of the main pole 130 so that a space through which part of the coil 110 passes is defined between the third portion 133 and each of the third portions 134C and 135C.

The write head unit 109 further includes a coupling section 138 lying on the insulating layer 137. The coupling section 138 couples a portion of the third portion 133 of the main pole 130 apart from the medium facing surface 80, a portion of the third portion 134C of the first yoke 134 apart from the medium facing surface 80, and a portion of the third portion 135C of the second yoke 135 apart from the medium facing surface 80 to each other.

The coupling section 138 is formed of a magnetic material. For example, one of CoFeN, CoNiFe, FeNi, and CoFe can be used as the material of the coupling section 138.

The third portion 133 of the main pole 130, the third portion 134C of the first yoke 134, the third portion 135C of the second yoke 135 and the coupling section 138 may be formed of separate magnetic layers. Alternatively, two or more of the above-listed components may be formed of a single magnetic layer.

The write head unit 109 further includes insulating layers 139, 140 and 141 each formed of an insulating material. The insulating layer 139 surrounds the third portion 133 of the main pole 130, the second and third portions 134B and 134C of the first yoke 134, the second and third portions 135B and 135C of the second yoke 135 and the coupling section 138. The insulating layer 140 lies on the third portion 133 of the main pole 130, the second and third portions 134B and 134C of the first yoke 134, the second and third portions 135B and 135C of the second yoke 135, the coupling section 138 and the insulating layer 139. The insulating layer 141 lies on the insulating layer 140. The insulating layers 139, 140 and 141 are formed of alumina, for example.

The winding 120 of the coil 110 is embedded in the insulating layers 136, 137, 139, 140 and 141. The leads L1 and L2 of the coil 110 are embedded in the insulating layer 136.

The first and second heat sinks 124 and 125 and the write shield 123 have the function of dissipating heat generated by the plasmon generator 119 outward from the plasmon generator 119 and the main pole 130. The separating film 126 includes a portion interposed between the main pole 130 and the plasmon generator 119. The separating film 126 is in contact with the second heat sink 125 and the write shield 123. Thus, where the separating film 126 is formed of a high thermal conductivity material such as nonmagnetic metal, the heat generated by the plasmon generator 119 can be transferred to the second heat sink 125 and the write shield 123 by the separating film 126. This allows the above-described effect of the first and second heat sinks 124 and 125 and the write shield 123 to be markedly exerted.

The first and second side shields 123A and 123B of the write shield 123 have the same functions as those of the first and second side shields 16A and 16B described in the first embodiment section. Specifically, the first and second side shields 123A and 123B of the write shield 123 have the functions of: capturing a disturbance magnetic field applied to the magnetic head from the outside thereof; capturing a magnetic flux that is produced from the end face 130a of the main pole 130 and spreads in the track width direction TW, and thereby preventing the magnetic flux from reaching the recording medium 90; and allowing a magnetic flux that has been produced from the end face 130a of the main pole 130 and has magnetized a portion of the recording medium 90 to flow back to the main pole 130.

Now, the coil 110 will be described in detail with reference to FIG. 13 and FIG. 18. As described previously, the winding 120 of the coil 110 extends to pass around the first yoke 134, around the main pole 130, and around the second yoke 135 in alternating directions. The shape of the winding 120 will be specifically described below. For description of the shape of the winding 120, the first end of the winding 120 is taken as the starting point, and the second end of the winding 120 is taken as the endpoint. As shown in FIG. 13, when viewed from the medium facing surface 80, the winding 20, starting from the first end, passes clockwise around the third portion 134C of the first yoke 134 less than once, then passes counterclockwise around the third portion 133 of the main pole 130 less than once, then passes clockwise around the third portion 135C of the second yoke 135 once or more, then passes counterclockwise around the third portion 133 of the main pole 130 less than once, and finally passes clockwise around the third potion 134C of the first yoke 134 less than once to the second end.

The winding 120 is configured in the same manner as the winding 20 of the first embodiment shown in FIG. 2 to FIG. 4. More specifically, the winding 120 includes the first dedicated portion D1, the first common portion C1, the second dedicated portion D2, the second common portion C2, the third dedicated portion D3, the third common portion C3, the fourth dedicated portion D4, the fourth common portion C4 and the fifth dedicated portion D5 connected in series in this order from the first end to the second end. The plurality of portions listed above are shown in FIG. 2 to FIG. 4. The arrangement of the plurality of portions will be described below.

The first dedicated portion D1 is located around the third portion 134C of the first yoke 134. In the present embodiment, the first dedicated portion D1 extends along a part of the periphery of the third portion 134C of the first yoke 134 located opposite from the third portion 133 of the main pole 130 and a part of the periphery of the third portion 134C of the first yoke 134 located at the trailing side end. The insulating layers 139 and 140 are interposed between the first dedicated portion D1 and the third portion 134C of the first yoke 134.

The first common portion C1 extends to pass through between the third portion 133 of the main pole 130 and the third portion 134C of the first yoke 134. The insulating layer 139 is interposed between the first common portion C1 and each of the third portion 133 of the main pole 130 and the third portion 134C of the first yoke 134.

The second dedicated portion D2 is located around the third portion 133 of the main pole 130. In the present embodiment, the second dedicated portion D2 is located on the leading side of the third portion 133 of the main pole 130 and extends in the track width direction TW. The insulating layer 137 is interposed between the second dedicated portion D2 and the third portion 133 the main pole 130.

The second common portion C2 extends to pass through between the third portion 133 of the main pole 130 and the third portion 135C of the second yoke 135. The insulating layer 139 is interposed between the second common portion C2 and each of the third portion 133 of the main pole 130 and the third portion 135C of the second yoke 135.

The third dedicated portion D3 is located around the third portion 135C of the second yoke 135. In the present embodiment, the third dedicated portion D3 extends along a part of the periphery of the third portion 135C of the second yoke 135 located at the trailing side end, a part of the periphery of the third portion 135C of the second yoke 135 located opposite from the third portion 133 of the main pole 130 and a part of the periphery of the third portion 135C of the second yoke 135 located at the leading side end. The insulating layers 137, 139 and 140 are interposed between the third dedicated portion D3 and the third portion 135C of the second yoke 135.

The third common portion C3 extends to pass through between the third portion 133 of the main pole 130 and the third portion 135C of the second yoke 135. In the present embodiment, the third common portion C3 is located closer to the medium facing surface 80 than is the second common portion C2. The insulating layer 139 is interposed between the third common portion C3 and each of the third portion 133 of the main pole 130 and the third portion 135C of the second yoke 135.

The fourth dedicated portion D4 is located around the third portion 133 of the main pole 130. In the present embodiment, the fourth dedicated portion D4 is located on the trailing side of the third portion 133 the main pole 130 and extends in the track width direction TW. The fourth dedicated portion D4 is located closer to the medium facing surface 80 than is the second dedicated portion D2. The insulating layer 140 is interposed between the fourth dedicated portion D4 and the third portion 133 of the main pole 130.

The fourth common portion C4 extends to pass through between the third portion 133 of the main pole 130 and the third portion 134C of the first yoke 134. In the present embodiment, the fourth common portion C4 is located closer to the medium facing surface 80 than is the first common portion C1. The insulating layer 139 is interposed between the fourth common portion C4 and each of the third portion 133 of the main pole 130 and the third portion 134C of the first yoke 134.

The fifth dedicated portion D5 is located around the third portion 134C of the first yoke 134. In the present embodiment, the fifth dedicated portion D5 is located on the leading side of the third portion 134C of the first yoke 134 and extends in the track width direction TW. The fifth dedicated portion D5 is located closer to the medium facing surface 80 than is the first dedicated portion D1. The insulating layer 137 is interposed between the fifth dedicated portion D5 and the third portion 134C of the first yoke 134.

The main coil portion 111 includes the first common portion C1, the second dedicated portion D2, the second common portion C2, the third common portion C3, the fourth dedicated portion D4 and the fourth common portion C4. The first common portion C1, the second dedicated portion D2 and the second common portion C2 surround approximately ¾ of the entire perimeter of the third portion 133 of the main pole 130. The third common portion C3, the fourth dedicated portion D4 and the fourth common portion C4 surround approximately ¾ of the entire perimeter of the third portion 133 of the main pole 130. Thus, the main coil portion 111 is of approximately 1.5 turn.

The first sub-coil portion 112A includes the first dedicated portion D1, the first common portion C1, the fourth common portion C4 and the fifth dedicated portion D5. The first dedicated portion D1 and the first common portion C1 surround approximately ¾ of the entire perimeter of the third portion 134C of the first yoke 134. The fourth common portion C4 and the fifth dedicated portion D5 surround approximately ½ of the third portion 134C of the entire perimeter of the first yoke 134. Thus, the first sub-coil portion 112A is of approximately 1.25 turn.

The second sub-coil portion 112B includes the second common portion C2, the third dedicated portion D3 and the third common portion C3. The second common portion C2 and the part of the third dedicated portion D3 surround approximately ¾ of the entire perimeter of the third portion 135C of the second yoke 135. The remainder of the third dedicated portion D3 and the third common portion C3 surround approximately ½ of the entire perimeter of the third portion 135C of the second yoke 135. Thus, the second sub-coil portion 112B is of approximately 1.25 turn.

The first common portion C1 and the fourth common portion C4 are used in common to form part of the main coil portion 111 and part of the first sub-coil portion 112A. The second common portion C2 and the third common portion C3 are used in common to form another part of the main coil portion 111 and part of the second sub-coil portion 112B. The second and fourth dedicated portions D2 and D4 are used to form the remainder of the main coil portion 111. The first and fifth dedicated portions D1 and D5 are used to form the remainder of the first sub-coil portion 112A. The third dedicated portion D3 is used to form the remainder of the second sub-coil portion 112B.

In FIG. 13, the arrows in the coil 110 indicate the direction of electric current flowing through the coil 110 at some point in time. As shown in FIG. 13, the direction of the electric current flowing around the third portion 133 of the main pole 130 via the main coil portion 111 is opposite to the direction of the electric current flowing around the third portion 134C of the first yoke 134 via the first sub-coil portion 112A and the electric current flowing around the third portion 135C of the second yoke 135 via the second sub-coil portion 112B. Thus, the direction of the magnetic field generated in the third portion 133 of the main pole 130 by the main coil portion 111 is opposite to the direction of the magnetic field generated in the third portion 134C of the first yoke 134 by the first sub-coil portion 112A and the magnetic field generated in the third portion 135C of the second yoke 135 by the second sub-coil portion 112B.

An example of the shape of the plasmon generator 119 will now be described with reference to FIG. 14 to FIG. 16. The plasmon generator 119 has a near-field light generating surface 119a located in the medium facing surface 80, a plasmon exciting section 119b which is a bottom surface, a top surface 119c, a rear end face 119d located opposite to the near-field light generating surface 119a, and two side surfaces 119e and 119f. The plasmon exciting section 119b is located at a predetermined distance from the evanescent light generating surface 116b of the core 116 and faces the evanescent light generating surface 116b. The cladding layer 118 is interposed between the evanescent light generating surface 116b and the plasmon exciting section 119b. For example, the plasmon generator 119 is generally rectangular in cross section parallel to the medium facing surface 80. The near-field light generating surface 119a is located between the end face 130a of the main pole 130 and the front end face 116a of the core 116. The near-field light generating surface 119a generates near-field light on the principle to be described later.

As shown in FIG. 16, the width of the plasmon generator 119 in the track width direction TW gradually increases with increasing distance from the medium facing surface 80 and then becomes constant. The width (the dimension in the track width direction TW) of the near-field light generating surface 119a is defined by the width of the plasmon generator 119 in the medium facing surface 80. The width of the near-field light generating surface 119a falls within the range of 5 to 40 nm, for example. The height of the near-field light generating surface 119a is defined by the height of the plasmon generator 119 in the medium facing surface 80. The height of the near-field light generating surface 119a falls within the range of 5 to 40 nm, for example.

An example of the shape of the main pole 130 will now be described with reference to FIG. 14, FIG. 15 and FIG. 17. As shown in FIG. 14 and FIG. 15, the end face 130a of the main pole 130 includes a first end face portion 131a, and a second end face portion 132a contiguous with the first end face portion 131a. The second end face portion 132a has a greater width in the track width direction TW than the first end face portion 131a. The near-field light generating surface 119a, the first end face portion 131a and the second end face portion 132a are arranged in this order along the direction T of travel of the recording medium 90.

The main pole 130 includes the first portion 131 and the second portion 132 as mentioned previously. As shown in FIG. 14 and FIG. 15, the first portion 131 has the first end face portion 131a. As shown in FIG. 17, the width of the first portion 131 in the track width direction TW gradually increases with increasing distance from the medium facing surface 80, and then becomes constant.

As shown in FIG. 14 and FIG. 15, the second portion 132 has the second end face portion 132a. As shown in FIG. 17, the width of the second portion 132 in the track width direction TW gradually increases with increasing distance from the medium facing surface 80, and then becomes constant. In the example shown in FIG. 17, the second portion 132 includes a narrow portion located between the medium facing surface 80 and a principal part of the second portion 132. The width of the narrow portion in the track width direction TW is substantially constant regardless of distance from the medium facing surface 80. The widths of the principal part and the narrow portion are equal at the boundary between the principal part and the narrow portion.

Now, the principle of generation of near-field light in the present embodiment and the principle of thermally-assisted magnetic recording using near-field light will be described in detail. Laser light emitted from a laser diode (not illustrated) enters the core 116. As shown in FIG. 18, the laser light 160 propagates through the core 116 toward the medium facing surface 80, and reaches the vicinity of the plasmon generator 119. The evanescent light generating surface 116b of the core 116 generates evanescent light based on the laser light 160 propagating through the core 116. More specifically, the laser light 160 is totally reflected at the evanescent light generating surface 116b, and the evanescent light generating surface 116b thereby generates evanescent light that permeates into the cladding layer 118. In the plasmon generator 119, surface plasmons are excited on the plasmon exciting section 119b through coupling with the aforementioned evanescent light. The surface plasmons propagate to the near-field light generating surface 119a, and the near-field light generating surface 119a generates near-field light based on the surface plasmons.

The near-field light generated from the near-field light generating surface 119a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 130 for data writing.

In the present embodiment, the coupling section 138 may be omitted as in the second embodiment. Further, as in the third embodiment, the top shield and the bottom shield may be provided. Further, the winding 120 of the coil 110 of the present embodiment may be shaped in the same manner as the winding 20 of the coil 10 of the fourth embodiment. The remainder of configuration, function and effects of the present embodiment are similar to those of any of the first to fourth embodiments.

The present invention is not limited to the foregoing embodiments, and various modifications may be made thereto. In the present invention, as far as the requirements of the appended claims are met, each of the main coil portion, the first sub-coil portion and the second sub-coil portion may have any shape and any number of turns.

Further, the magnetic head of the present invention may include either one or both of a yoke located on the trailing side of the main pole and a yoke located on the leading side of the main pole, in place of or in addition to the first and second yokes of any of the foregoing embodiments.

In the present invention, the coil may be such that the main coil portion and the at least one sub-coil portion are formed of separate windings.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:
   a medium facing surface configured to face a recording medium;
   a coil for producing a magnetic field corresponding to data to be written on the recording medium;
   a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;
   a write shield formed of a magnetic material and having an end face located in the medium facing surface; and
   a first yoke and a second yoke each formed of a magnetic material and connected to the write shield, the first yoke and the second yoke being located on opposite sides of the main pole in a track width direction, wherein
   the coil includes a main coil portion for driving the main pole, a first sub-coil portion for driving the first yoke, and a second sub-coil portion for driving the second yoke,
   the main coil portion surrounds at least part of an entire perimeter of the main pole as viewed from the medium facing surface,
   the first sub-coil portion surrounds at least part of an entire perimeter of the first yoke as viewed from the medium facing surface,
   the second sub-coil portion surrounds at least part of an entire perimeter of the second yoke as viewed from the medium facing surface,
   the main coil portion and the first and second sub-coil portions are configured so that a magnetic field produced in the main pole by the main coil portion and a magnetic field produced in each of the first and second yokes by the first and second sub-coil portions are in directions opposite to each other.

2. The magnetic head for perpendicular magnetic recording according to claim 1, wherein
   the write shield includes a first side shield and a second side shield located on opposite sides of the main pole in the track width direction,
   the first yoke is connected to the first side shield, and
   the second yoke is connected to the second side shield.

3. The magnetic head for perpendicular magnetic recording according to claim 1, wherein the coil includes a winding constituting the main coil portion and the first and second sub-coil portions, and the winding extends to pass around the first yoke, around the main pole, and around the second yoke in alternating directions.

4. The magnetic head for perpendicular magnetic recording according to claim 3, wherein the winding includes a first dedicated portion, a first common portion, a second dedicated portion, a second common portion and a third dedicated portion connected in series in this order, the first dedicated portion is located around the first yoke, the first common portion extends to pass through between the main pole and the first yoke, the second dedicated portion is located around the main pole, the second common portion extends to pass through between the main pole and the second yoke, the third dedicated portion is located around the second yoke, the first sub-coil portion includes the first dedicated portion and the first common portion, the main coil portion includes the first common portion, the second dedicated portion and the second common portion, and the second sub-coil portion includes the second common portion and the third dedicated portion.

5. The magnetic head for perpendicular magnetic recording according to claim 4, wherein the winding further includes a third common portion, a fourth dedicated portion, a fourth common portion and a fifth dedicated portion, the first dedicated portion, the first common portion, the second dedicated portion, the second common portion, the third dedicated portion, the third common portion, the fourth dedicated portion, the fourth common portion and the fifth dedicated portion are connected in series in this order, the third common portion extends to pass through between the main pole and the second yoke, the fourth dedicated portion is located around the main pole, the fourth common portion extends to pass through between the main pole and the first yoke, the fifth dedicated portion is located around the first yoke, the first sub-coil portion includes the first dedicated portion, the first common portion, the fourth common portion and the fifth dedicated portion, the main coil portion includes the first common portion, the second dedicated portion, the second common portion, the third common portion, the fourth dedicated portion and the fourth common portion, the second sub-coil portion includes the second common portion, the third dedicated portion and the third common portion.

* * * * *